(12) United States Patent
Aleem et al.

(10) Patent No.: US 12,062,197 B2
(45) Date of Patent: Aug. 13, 2024

(54) VALIDATION OF MODELING AND SIMULATION OF WEARABLE DEVICE

(71) Applicant: Google LLC, Mountain View, CA (US)

(72) Inventors: Idris Syed Aleem, Kitchener (CA); Rees Anwyl Samuel Simmons, Waterloo (CA); Cory Stegelmeier, Mountain View, CA (US); Philip Lindsley Davidson, Arlington, MA (US)

(73) Assignee: Google LLC, Mountain View, CA (US)

( * ) Notice: Subject to any disclaimer, the term of this patent is extended or adjusted under 35 U.S.C. 154(b) by 343 days.

(21) Appl. No.: 17/650,449

(22) Filed: Feb. 9, 2022

(65) Prior Publication Data

US 2023/0252655 A1 Aug. 10, 2023

(51) Int. Cl.
G06K 9/00 (2022.01)
G02B 27/01 (2006.01)
G06T 7/33 (2017.01)
G06T 19/00 (2011.01)

(52) U.S. Cl.
CPC .......... *G06T 7/337* (2017.01); *G02B 27/0172* (2013.01); *G06T 19/006* (2013.01); *G02B 2027/0178* (2013.01); *G06T 2207/20224* (2013.01); *G06T 2207/30204* (2013.01)

(58) Field of Classification Search
CPC .......... G06T 7/337; G06T 19/006; G06T 2207/20224; G06T 2207/30204; G06T 2219/2004; G06T 19/20; G02B 27/0172; G02B 2027/0178
See application file for complete search history.

(56) References Cited

U.S. PATENT DOCUMENTS

| | | | |
|---|---|---|---|
| 6,944,327 B1* | 9/2005 | Soatto | G02C 13/003 351/159.75 |
| 11,158,082 B2 | 10/2021 | Le Gallou et al. | |
| 11,914,226 B2* | 2/2024 | Fonte | G06Q 30/0621 |
| 2012/0206334 A1 | 8/2012 | Osterhout et al. | |
| 2012/0313955 A1* | 12/2012 | Choukroun | G06T 17/205 345/582 |

(Continued)

FOREIGN PATENT DOCUMENTS

WO 2017205903 A1 12/2017

OTHER PUBLICATIONS

Zhang, "Augmented Reality Virtual Glasses Try-On Technology Based on IOS Platform", EURASIP Journal on Image and Video Processing, 2018, 19 pages.

(Continued)

*Primary Examiner* — Shervin K Nakhjavan
(74) *Attorney, Agent, or Firm* — Brake Hughes Bellermann LLP

(57) ABSTRACT

Systems and methods for validation of modeling and simulation systems that provide for the virtual fitting of wearable devices, such as glasses, by a user. Three-dimensional modeling and simulation of test subject both with and without fitting frames corresponding to a wearable device may be captured to validate the modeling and simulation modules and associated algorithms and machine learning modules used to simulate the fit of the wearable device on a user. Validation in this manner may provide for increased accuracy/realism of the modeling and simulation systems.

20 Claims, 20 Drawing Sheets

(56) References Cited

U.S. PATENT DOCUMENTS

| | | | |
|---|---|---|---|
| 2013/0314411 A1 | 11/2013 | Turetzkey | |
| 2013/0342575 A1* | 12/2013 | Coon | G06T 11/00 345/634 |
| 2015/0055085 A1 | 2/2015 | Fonte et al. | |
| 2015/0127132 A1* | 5/2015 | Nyong'o | B29D 12/02 700/98 |
| 2015/0235416 A1* | 8/2015 | Coon | G02C 13/003 345/423 |
| 2017/0038767 A1* | 2/2017 | Cluckers | G06Q 30/0621 |
| 2018/0017815 A1* | 1/2018 | Chumbley | G02C 7/027 |

OTHER PUBLICATIONS

International Search Report and Written Opinion for PCT Application No. PCT/US2022/076656, mailed on Jan. 10, 2023, 12 pages.

* cited by examiner

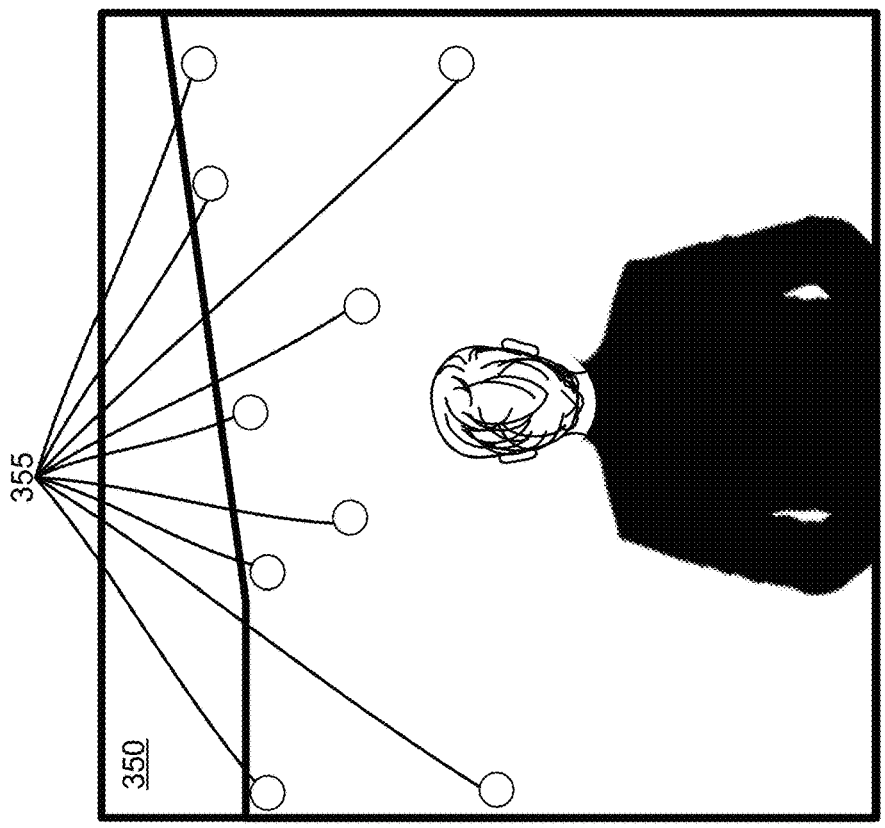
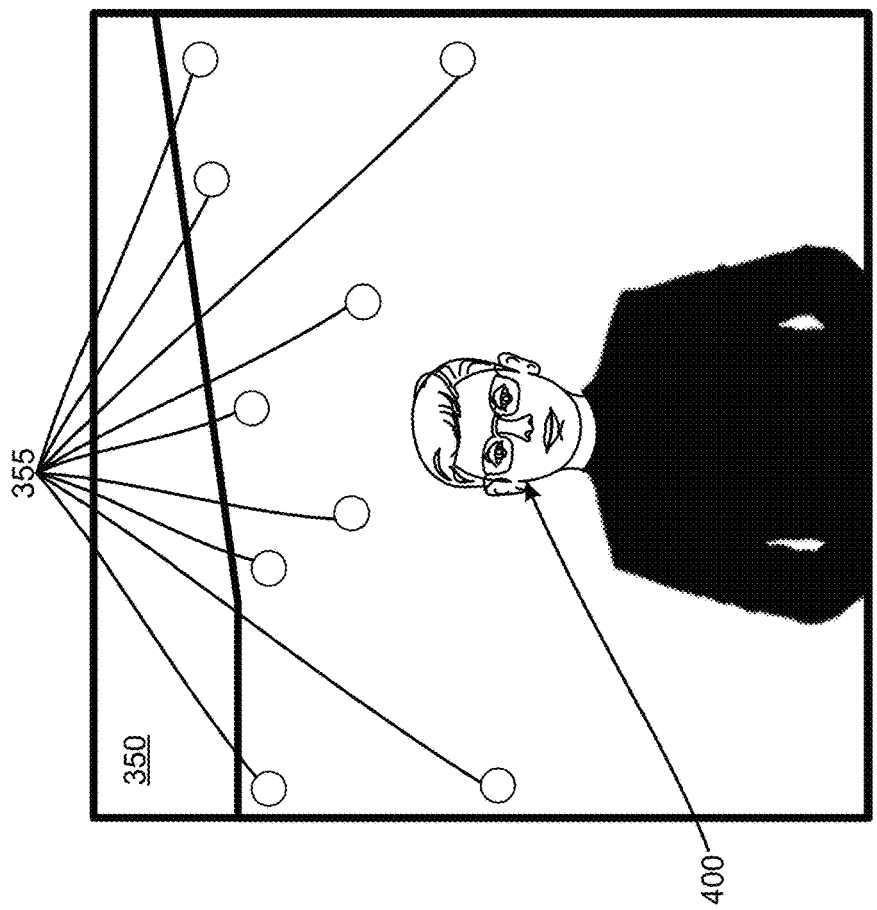
FIG. 4B
FIG. 4A

VALIDATION OF MODELING AND SIMULATION OF WEARABLE DEVICE

FIELD

This description relates to the simulation of a wearable device on a wearer, and in particular, to a simulation model for modeling a head-mounted wearable device on the head of the wearer.

BACKGROUND

Wearable devices may include head-mounted devices, ear-worn devices, hand and/or wrist worn devices, and the like. A manner in which the wearable device fits a particular wearer may be dependent on features specific to the wearer and how the wearable device interacts with the features associated with the specific body part at which the wearable device is worn by the wearer. A wearer may want to customize a wearable device such as, for example, a pair of glasses, for fit and/or function including, for example, selection of frames, incorporation of prescription lenses, incorporation of a display device, incorporation of computing capabilities, and other such features. Many existing systems for procurement of these types of wearable devices do not provide for accurate customization and fitting without access to a retail establishment. Existing virtual systems may provide a virtual try-on capability, superimposing an image of selected eyewear onto an image of the wearer; however, such systems may not necessarily be capable of providing accurate fitting of selected eyewear for a specific wearer.

SUMMARY

In one general aspect, a method includes generating, by a simulation module of a computing system, a combined image, the combined image including a three-dimensional model of a fitting frame superimposed on a reference image, the reference image including a three-dimensional image of the fitting frame worn on a head of a subject; generating, by the simulation module, an aligned image, including superimposing the three-dimensional reference image onto a base image, the base image including a three-dimensional image of the head of the subject; calculating, from the aligned image, an alignment between a pose of the head of the subject in the base image and a pose of the head of the subject in the reference image superimposed on the base image; aligning a positioning a rendering of the fitting frame on the reference image based on the calculated alignment; and generating a simulation image, including positioning the rendering of the fitting frame on the base image based on the aligned position of the rendering of the fitting frame on the reference image.

In some implementations, generating the combined image includes detecting at least one visual marker on the fitting frame worn by the subject in the reference image; detecting at least one corresponding visual marker on the three-dimensional model of the fitting frame; and superimposing the three-dimensional model of the fitting frame on the reference image with the at least one corresponding visual marker detected on the three-dimensional model of the fitting frame aligned with the at least one visual marker detected on the fitting frame worn by the subject in the reference image. In some implementations, detecting the at least one visual marker on the fitting frame worn by the subject in the reference image includes detecting the at least one visual marker located at at least one of an outer peripheral portion of a first rim portion of the fitting frame; an outer peripheral portion of a second rim portion of the fitting frame; a first arm portion of the fitting frame; or a second arm portion of the fitting frame. In some implementations, superimposing the three-dimensional model of the fitting frame on the reference image includes aligning a plurality of corners of the at least one visual marker of the three-dimensional model of the fitting frame with a corresponding plurality of corners of the at least one visual marker of the fitting frame worn by the subject in the reference image.

In some implementations, the at least one visual marker on the fitting frame includes at least one visual marker on a rim portion of the fitting frame and at least one visual marker on an arm portion of the fitting frame, and the at least one corresponding visual marker on the three-dimensional model includes at least one visual marker on a rim portion of the three-dimensional model and at least one visual marker on an arm portion of the three-dimensional model. In some implementations, the method also includes aligning the at least one visual marker on the rim portion of the three-dimensional model with the corresponding at least one visual marker on the rim portion of the fitting frame in the reference image; measuring a first placement difference between the three-dimensional model and the fitting frame based on the aligning of the at least one visual marker on the rim portion of the three-dimensional model and the corresponding at least one visual marker on the rim portion of the fitting frame; aligning the at least one visual marker on the arm portion of the three-dimensional model with the corresponding at least one visual marker on the arm portion of the fitting frame; and measuring a second placement difference between the three-dimensional model and the fitting frame based on the aligning of the at least one visual marker on the arm portion of the three-dimensional model and the corresponding at least one visual marker on the rim portion of the fitting frame. In some implementations, the method also includes adjusting an algorithm of the simulation module to incorporate the first placement difference and the second placement difference.

In some implementations, generating the aligned image includes generating a first extracted image from the base image, the first extracted image capturing a defined portion of the base image corresponding to region of the head of the subject associated with the fitting frame from the base image; generating a second extracted from the reference image, the second extracted image capturing a defined portion of the reference image corresponding to the region of the head of the subject wearing the fitting frame; and superimposing the second extracted image on the first extracted image.

In some implementations, the method also includes capturing, by an image capture assembly of the computing system, the base image including the three-dimensional head of the subject without the fitting frames; and capturing, by the image capture assembly, the reference image including the three-dimensional head of the subject wearing the fitting frames. In some implementations, the pose of the head of the subject in the base image is different from the pose of the head of the subject in the reference image.

In another general aspect, a non-transitory computer-readable medium stores executable instructions that, when executed by at least one processor of a computing system, are configured to cause the at least one processor to generate, by a simulation module of the computing system, a combined image, the combined image including a three-dimensional model of a fitting frame superimposed on a reference image, the reference image including a three-dimensional image of the fitting frame worn on a head of a subject; generate, by the simulation module, an aligned image, including superimposing the three-dimensional reference image onto a base image, the base image including a three-dimensional image of the head of the subject; calculate, from the aligned image, an alignment between a pose of the head of the subject in the base image and a pose of the head of the subject in the reference image superimposed on the base image; align a positioning a rendering of the fitting frame on the reference image based on the calculated alignment; and generate a simulation image, including positioning the rendering of the fitting frame on the base image based on the aligned position of the rendering of the fitting frame on the reference image.

In some implementations, the instructions are configured to cause the at least one processor to generate the combined image, including detect at least one visual marker on the fitting frame worn by the subject in the reference image; detect at least one corresponding visual marker on the three-dimensional model of the fitting frame; and superimpose the three-dimensional model of the fitting frame on the reference image with the at least one corresponding visual marker detected on the three-dimensional model of the fitting frame aligned with the at least one visual marker detected on the fitting frame worn by the subject in the reference image.

In some implementations, the instructions are configured to cause the at least one processor to detect the at least one visual marker on the fitting frame worn by the subject in the reference image including detecting the at least one visual marker located at at least one of an outer peripheral portion of a first rim portion of the fitting frame; an outer peripheral portion of a second rim portion of the fitting frame; a first arm portion of the fitting frame; or a second arm portion of the fitting frame. In some implementations, the instructions are configured to cause the at least one processor to superimpose the three-dimensional model of the fitting frame on the reference image, including align a plurality of corners of the at least one visual marker of the three-dimensional model of the fitting frame with a corresponding plurality of corners of the at least one visual marker of the fitting frame worn by the subject in the reference image.

In some implementations, the at least one visual marker on the fitting frame includes at least one visual marker on a rim portion of the fitting frame and at least one visual marker on an arm portion of the fitting frame, and the at least one corresponding visual marker on the three-dimensional model includes at least one visual marker on a rim portion of the three-dimensional model and at least one visual marker on an arm portion of the three-dimensional model. In some implementations, the instructions are configured to cause the at least one processor to align the at least one visual marker on the rim portion of the three-dimensional model with the corresponding at least one visual marker on the rim portion of the fitting frame in the reference image; measure a first placement difference between the three-dimensional model and the fitting frame based on the aligning of the at least one visual marker on the rim portion of the three-dimensional model and the corresponding at least one visual marker on the rim portion of the fitting frame; align the at least one visual marker on the arm portion of the three-dimensional model with the corresponding at least one visual marker on the arm portion of the fitting frame; and measure a second placement difference between the three-dimensional model and the fitting frame based on the aligning of the at least one visual marker on the arm portion of the three-dimensional model and the corresponding at least one visual marker on the rim portion of the fitting frame. In some implementations, the instructions are configured to cause the at least one processor to adjust an algorithm of the simulation module to incorporate the first placement difference and the second placement difference.

In some implementations, the instructions are configured to cause the at least one processor to generate the aligned image, including generate a first extracted image from the base image, the first extracted image capturing a defined portion of the base image corresponding to region of the head of the subject associated with the fitting frame from the base image; generate a second extracted image from the reference image, the second extracted image capturing a defined portion of the reference image corresponding to the region of the head of the subject wearing the fitting frame; and superimpose the second extracted image on the first extracted image. In some implementations, the instructions are configured to cause the at least one processor to capture, by an image capture assembly of the computing system, the base image including the three-dimensional head of the subject without the fitting frame; and capture, by the image capture assembly, the reference image including the three-dimensional head of the subject wearing the fitting frame. In some implementations, the pose of the head of the subject in the base image is different from the pose of the head of the subject in the reference image.

The details of one or more implementations are set forth in the accompanying drawings and the description below. Other features will be apparent from the description and drawings, and from the claims.

BRIEF DESCRIPTION OF THE DRAWINGS

Examples will be more fully understood from the detailed description herein and the accompanying drawings, wherein like elements are represented by like reference numerals, which are given by way of illustration and thus are not limiting of the example implementations.

FIGS. 4A-4D illustrate the capture of a reference image of the test subject shown in FIGS. 3A-3C, including fitting frames, in accordance with implementations described herein.

DETAILED DESCRIPTION

Figure 1A:
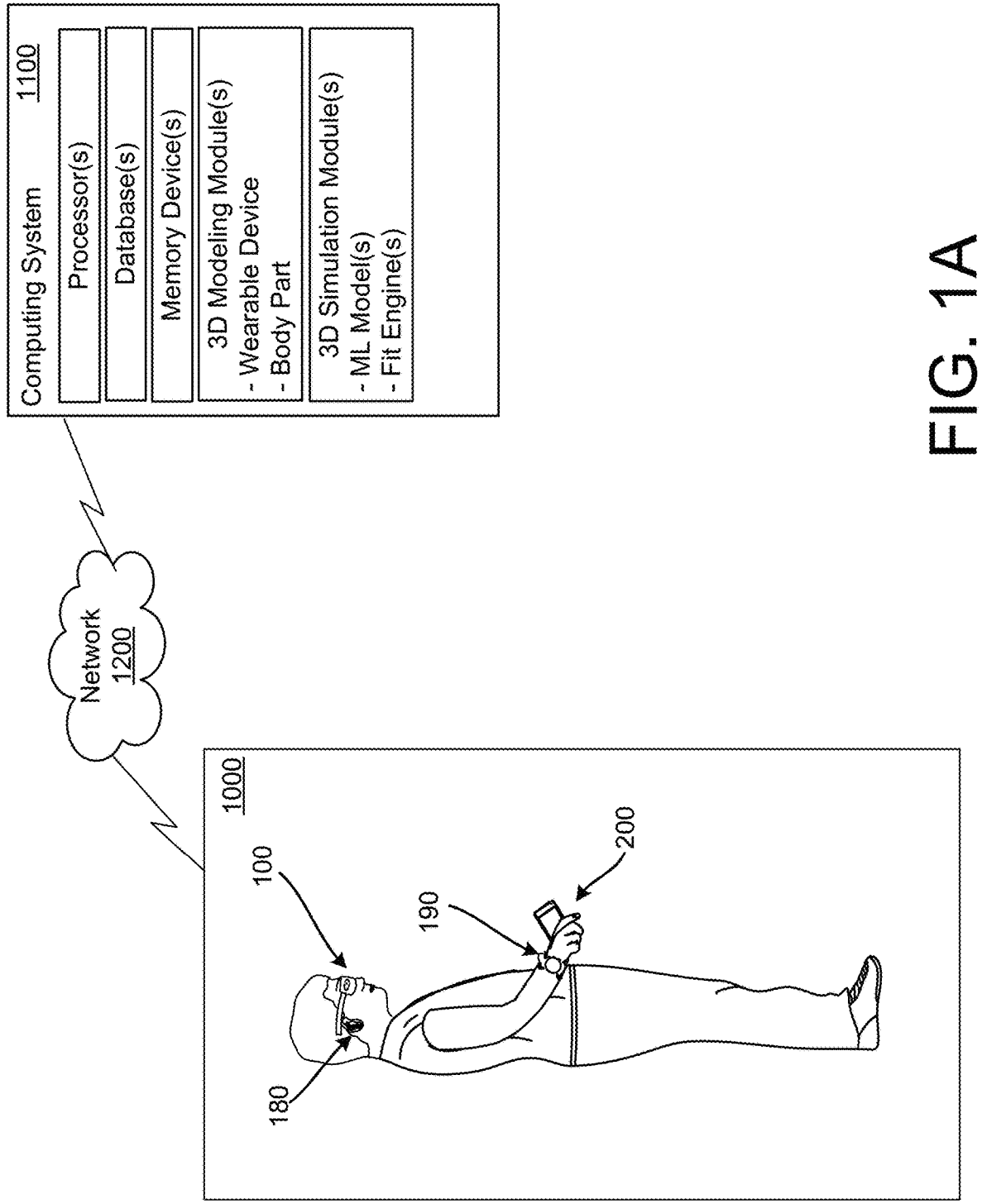
FIG. 1A illustrates an example system, in accordance with implementations described herein.

This disclosure relates to systems and methods involved in the virtual selection and fitting of a wearable device. In particular, this disclosure relates to the development and validation of modeling and simulation systems that provide for the fitting of wearable devices, such as glasses, for a wearer. In some examples, this includes wearable devices in the form of smart glasses including computing capabilities, display capabilities, audio capabilities and other such capabilities. In some examples, one or more three-dimensional simulation models may facilitate the virtual selection and fitting of the wearable device for the wearer. In some examples, a simulator, for example, a three-dimensional simulator may fit three-dimensional models of wearable devices (for example, glasses) on three-dimensional models of the wearer (for example, the face and/or the head of the wearer), to determine a fit of the wearable device on the wearer.

A simulator, or a simulation module, or a simulation engine, may be used to predict and/or simulate where a three-dimensional model of a wearable device, such as glasses, or smart glasses, will be worn on a three-dimensional head/face of a potential customer using a virtual fitting system for selection and purchase of the wearable device (rather than accessing a traditional retail establishment for selection and online purchase). Placement prediction and/or simulation of the glasses on the head of the customer may facilitate the identification of glasses (from an inventory of available glasses) which will physically fit the customer. Placement prediction and/or simulation of the glasses on the head of the customer may facilitate the identification of glasses (from the inventory of available glasses) in which display content (output by a display device of the glasses) will be visible to the customer wearing the glasses. In a situation in which prescription lenses are to be incorporated into the glasses, placement prediction and/or simulation of the glasses on the head of the customer may facilitate the determination of lens measurements for the customer's prescription. Accuracy in the placement prediction and/or simulation of the glasses on the head of the customer will improve the fit and function of the product delivered to the customer, and improve consumer confidence in the use of the virtual fitting and selection system for the purchase of wearable devices.

Hereinafter, systems and methods, in accordance with implementations described herein, will be described with respect to the validation and improvement of the simulation system, and in particular, the prediction of placement of the wearable device on the wearer (i.e., the placement of glasses on the head and/or face of the wearer). Hereinafter, systems and methods, in accordance with implementations described herein, will be described with respect to the placement of a wearable device in the form of glasses on the head/face of a test subject, for the purpose of validation and/or adjustment of the simulation model. The principles to be described herein may be applied to the systems providing for the simulation and fitting of other types of wearable devices.

Systems and methods, in accordance with implementations described herein, may implement a simulation engine of a simulator to position a three-dimensional model of a wearable device, i.e., glasses, on a three-dimensional model of a head of a test subject. The simulated positioning of the glasses on the head of the test subject may be compared to an image capture of a corresponding pair of physical glasses positioned on the head of the test subject. Correspondence between the simulated model and the image capture may be indicative of a level of accuracy of the simulation model. In some examples, relative positioning of one or more visual markers on the physical glasses and/or one or more physical features of the physical glasses relative to corresponding one or more visual markers and/or one or more physical features of the rendered glasses in the simulated model may form at least a portion of the basis of the comparison. In some examples, positioning of the physical glasses relative to one or more facial features of the test subject in the image capture relative to the positioning of the rendered glasses relative to the corresponding physical features in the simulated model may form at least a portion of the basis of the comparison.

Hereinafter, systems and methods, in accordance with implementations described herein, will be described with respect to the validation and improvement of simulation (models) associated with the simulation of a wearable computing device in the form of a head mounted display device, such as, for example, smart glasses including a display device, on a head of a wearer, for purposes of discussion and illustration. The principles to be described herein may be applied to the validation and improvement of simulation models associated with the simulation of other types of wearable devices.

FIG. 1A is a third person view of a user in an ambient environment 1000, with one or more computing systems 1100 accessible to the wearer via a network 1200. FIG. 1A illustrates numerous different wearable devices that are operable by the user, including a first wearable device 100 in the form of glasses worn on the head of the user, a second wearable device 180 in the form of ear buds worn in one or both ears of the user, a third wearable device 190 in the form of a watch worn on the wrist of the user, and a handheld computing device 200 held by the user. In some examples, the first wearable device 100 is in the form of a pair of smart glasses including, for example, a display, a camera that can capture images of the ambient environment, audio input/output capability, user input capability and the like. In some examples, the second wearable device 180 is in the form of an ear worn computing device such as headphones, or earbuds, that can include audio input/output capability, a camera that can capture images of the ambient environment, user input capability and the like. In some examples, the third wearable device 190 is in the form of a smart watch or smart band that includes, for example, a display, a camera that can capture images of the ambient environment, audio input/output capability, user input capability and the like. In some examples, the handheld computing device 200 can include a display, a camera that can capture images of the ambient environment, audio input/output capability, user input capability, and the like, such as in a smartphone. In some examples, the example wearable devices 100, 180, 190 and handheld device 200 can communicate with each other and/or with the computing system(s) 1100 to exchange information, to receive and transmit input and/or output, and the like. The principles to be described herein may be applied to other types of wearable devices not specifically shown in FIG. 1A.

Hereinafter, systems and methods will be described with respect to the virtual fitting of a head mounted wearable device, simply for ease of discussion and illustration. The head mounted wearable devices described herein may include, for example, consumer grade eyeglasses with or without prescription lenses, smart glasses including a display and associated computing capability, with or without prescription lenses, and other such head mounted wearable devices. As noted above, the principles to be described herein may be similarly applied to the virtual fitting of other types of wearable devices.

In some situations, a user may choose to use a computing device (such as, for example, the handheld computing device 200 shown in FIG. 1A, or another computing device)

for the virtual selection and fitting of a wearable device, such as the glasses 100 described above. For example, a user may use an application executing on the example computing device 200 to select glasses for virtual try on from the computing system(s) 1100 available via the network 1200. In order to provide for the virtual fitting of a wearable device such as the example, glasses, a simulator (for example, available from the computing system(s) 1100) may predict where a three-dimensional model of the glasses 100 will be worn on a three-dimensional scan of the head of the user. This simulated placement of the glasses 100 on the head of the user may help to identify which, of a plurality of available glasses (for example, having configuration data available in a database of the computing system(s) 1100) will fit the user. In a case in which the glasses 100 are smart glasses including a display device, this simulated placement of the glasses 100 on the head of the user may identify which of the plurality of available glasses will provide for placement of the display device such that displayed content will be visible to the user. The ability to simulate a pose (i.e., a position and/or orientation) of the glasses 100 on the head of the user facilitates the iteration of future designs for glasses, allowing for further refinement of physical/wearable fit, display fit/display visibility, and other such factors. The ability to effectively use virtual try on to achieve these results relies on the ability of the simulation module to accurately predict and simulate how the glasses will fit on the head of the user. Inaccuracy in the simulation of the pose and fit of the glasses on the head of the user may result in glasses that do not properly fit the user and/or do not work as intended for the user, rendering the virtual try on process ineffective.

Accordingly, systems and methods, in accordance with implementations described herein, provide for the validation of the virtual simulation of the wearable device on the corresponding portion of the body of the user, for example, a head mounted wearable device, or glasses, on the head and/or face of the user, so that the simulated fit corresponds to the fit of the physical glasses on the head/face of the user. In some examples, this includes the comparison of a simulation, or a rendered image, generated by the simulator of a three-dimensional model of the corresponding glasses rendered on a three-dimensional model of the head of the test subject with an image capture of a test subject wearing physical frames. In some examples, the comparison may be based on the detection of one or more visual markers and/or physical features on the physical glasses and the corresponding one or more visual markers and/or physical features included in the virtual three-dimensional model of the physical glasses, which may be retrieved from a database accessible to the simulator. In some examples, this process may be repeated multiple times, and/or with multiple different test subjects, and/or with multiple different physical glasses (and corresponding virtual models), and/or combinations thereof, to continue to refine the algorithms and/or machine learning models enabling the simulator.

Figure 1B:
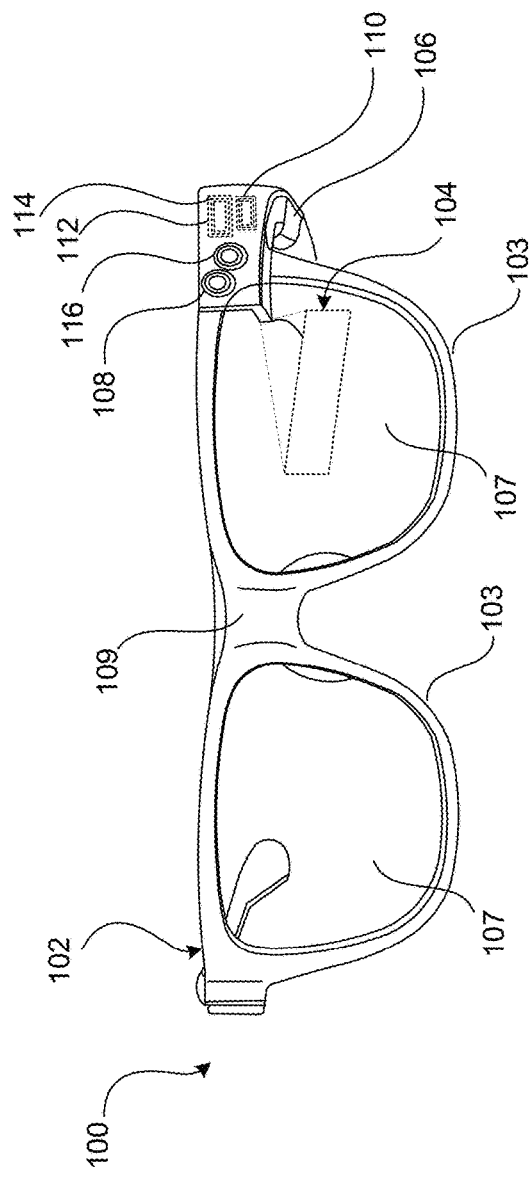
FIG. 1B is a front view.
Figure 1C:
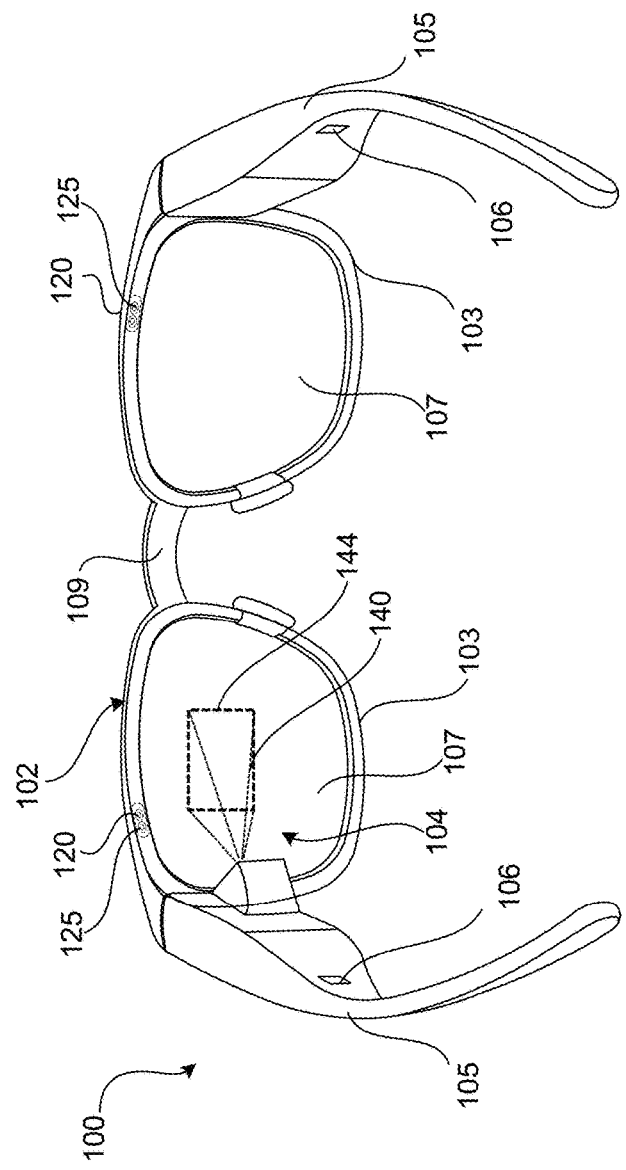
FIG. 1C is a rear view, of an example wearable device shown in FIG. 1A, in accordance with implementations described herein.

An example head mounted wearable device 100 in the form of a pair of smart glasses is shown in FIGS. 1B and 1C, for purposes of discussion and illustration. The example head mounted wearable device 100 includes a frame 102 having rim portions 103 surrounding glass portion, or lenses 107, and arm portions 105 coupled to a respective rim portion 103. In some examples, the lenses 107 may be corrective/prescription lenses. In some examples, the lenses 107 may be glass portions that do not necessarily incorporate corrective/prescription parameters. A bridge portion 109 may connect the rim portions 103 of the frame 102. In this example, in which the wearable device 100 is in the form of a pair of smart glasses, or augmented reality glasses, a display device 104 may be coupled in a portion of the frame 102, for example in the arm portion 105 of the frame 102, with an eye box 140 extending toward at least one of the lenses 107, for output of content at an output coupler 144 at which content output by the display device 104 may be visible to the user. In some examples, the output coupler 144 may be substantially coincident with the lens(es) 107. In this form, the wearable device 100 can also include an audio output device 106 (such as, for example, one or more speakers), an illumination device 108, a sensing system 110, a control system 112, at least one processor 114, and an outward facing image sensor 116, or camera 116. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104. In some examples, a gaze tracking device 120 including, for example, one or more sensors 125, may detect and track eye gaze direction and movement. Data captured by the sensor(s) 125 may be processed to detect and track gaze direction and movement as a user input. In some implementations, the sensing system 110 may include various sensing devices and the control system 112 may include various control system devices including, for example, one or more processors 114 operably coupled to the components of the control system 112. In some implementations, the control system 112 may include a communication module providing for communication and exchange of information between the wearable device 100 and other external devices.

The example wearable device 100 can include more, or fewer features than described above. The principles to be described herein are applicable to the virtual sizing and fitting of head mounted wearable devices including computing capabilities, i.e., smart glasses, and also to head mounted wearable devices that do not include computing capabilities, and to head mounted wearable devices with or without corrective lenses.

In a head mounted wearable device such as the example wearable device 100 shown in FIGS. 1A-1C, wearable fit parameters take into account how a frame 102 is positioned on the head and/or face of a particular user, how the frame 102 fits the user, how the frame 102 looks and/or feels on the user, and the like. Wearable fit parameters may take into account, for example whether the frame 102 is wide enough to be comfortable with respect to the user's temples, whether the rim portions 103 and bridge portion 109 are sized so that the bridge portion 109 can rest comfortably on the bridge of the nose, whether the arm portions 105 are sized to comfortably rest on the appropriate portion of the ears, and other such comfort related considerations. Wearable fit parameters may take into account as-worn parameters including how the user naturally wears the wearable device 100, such as, for example, head posture/how the user naturally holds their head, how the user positions the wearable device 100 relative to their face, and the like. Wearable fit parameters may also take into account whether the size and/or shape and/or contour of the frame 102 is aesthetically pleasing to the user, and is compatible with the user's facial features.

Display fit parameters may provide an indication of placement of the display device 104 so that content displayed by the display device 104 is visible to the user and/or that color and/or brightness of content viewed by the user is substantially uniform and/or substantially accurately perceived by the user, and other such factors. For example, display fit parameters may provide an indication of placement of the display device 104 so that content displayed by the display device 104 is captured within at least a set portion of the field of view of the user so that at least a set level of gazability is provided. This may correspond to an amount, or portion, or percentage of the display of content that is visible to the user at a set brightness level and a set pupil size at a periphery (for example, a least visible corner) of the field of view of the user. In a wearable device configured as smart glasses, or augmented reality glasses, the display fit parameters may be used to configure the display device 104 to provide the best possible placement of the display of content to the user.

Figure 2A:
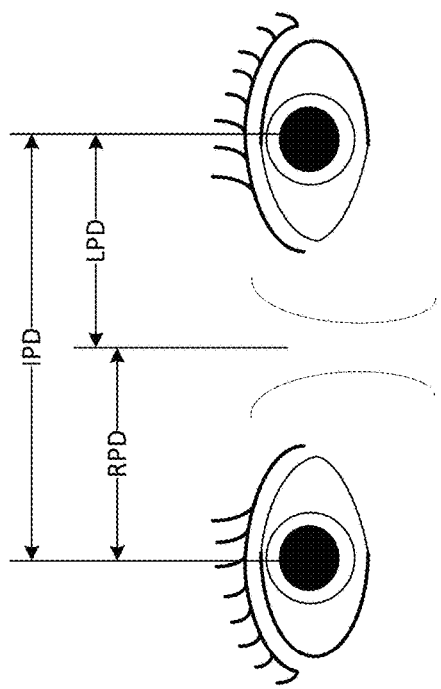
FIGS. 2A-2D illustrate example ophthalmic measurements.
Figure 2B:
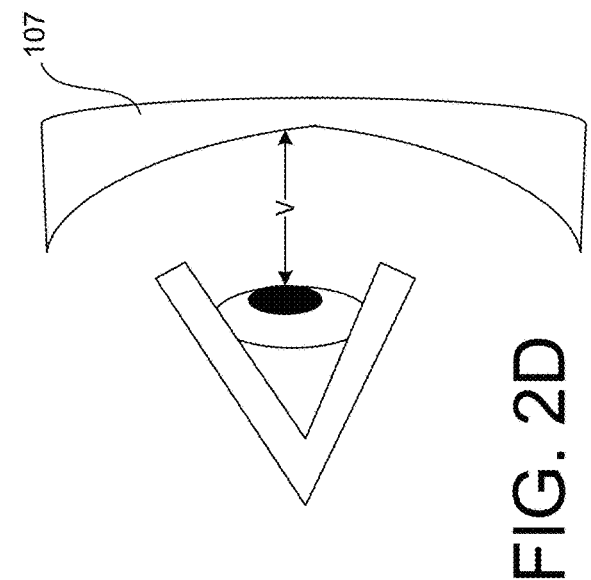
Figure 2C:
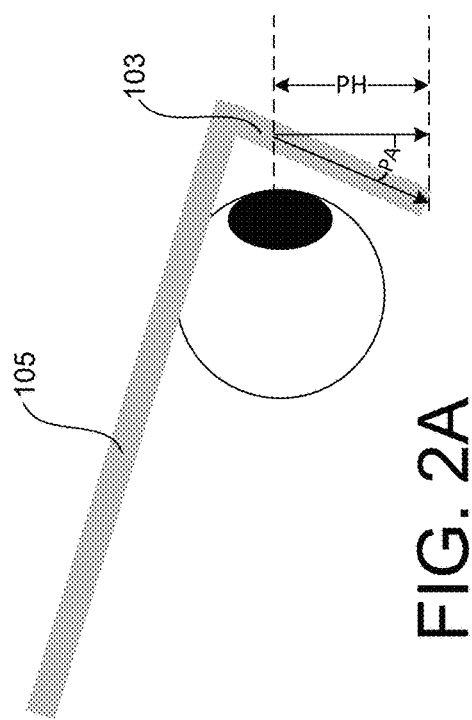
Figure 2D:
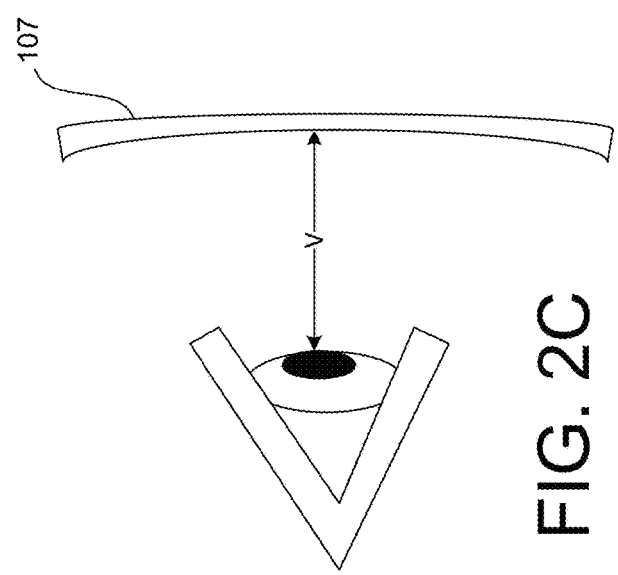

Ophthalmic fit parameters, or ophthalmic fit measurements may be taken into account when the lenses 107 to be incorporated into the wearable device 100 are prescription, or corrective lenses. Some example ophthalmic fit measurements are shown in FIGS. 2A-2D. Ophthalmic fit measurements may include, for example, a pupil height PH (a distance from a center of the pupil to a bottom of the lens 107), an interpupillary distance IPD (a distance between the pupils), a monocular pupil distance, for example, a left pupil distance LPD (a distance from a central portion of the bridge of the nose to the left pupil) and a right pupil distance RPD (a distance from the central portion of the bridge of nose to right pupil), a pantoscopic angle PA (an angle defined by the tilt of the lens 107 with respect to vertical), a vertex distance V (a distance from the cornea to the lens 107), and other such parameters, or measures. FIG. 2C illustrates a vertex distance V associated with a relatively low diopter lens 107. FIG. 2D illustrates a vertex distance V associated with a relatively higher diopter lens 107. Ophthalmic fit measurements may be taken into account when fitting the wearable device 100 including the display device 104, to provide for placement of the display of content by the display device 104 within an eye box defined by a three-dimensional volume extending between the lens 107 and the eye of the user, where the display of content will be within the field of view of the user, and thus visible to the user. Ophthalmic fit measurements may also be taken into account when fitting the wearable device 100 including the prescription, or corrective lenses into the frame 102 of a wearable device that does not include computing and/or display capability.

FIGS. 3A-4D illustrate a process, in accordance with implementations described herein, for the capture of three-dimensional images, or scans, of a test subject, for use in the validation of a simulation module of a computing system that provides for the simulated placement of glasses on a head of a user.

Figure 3A:
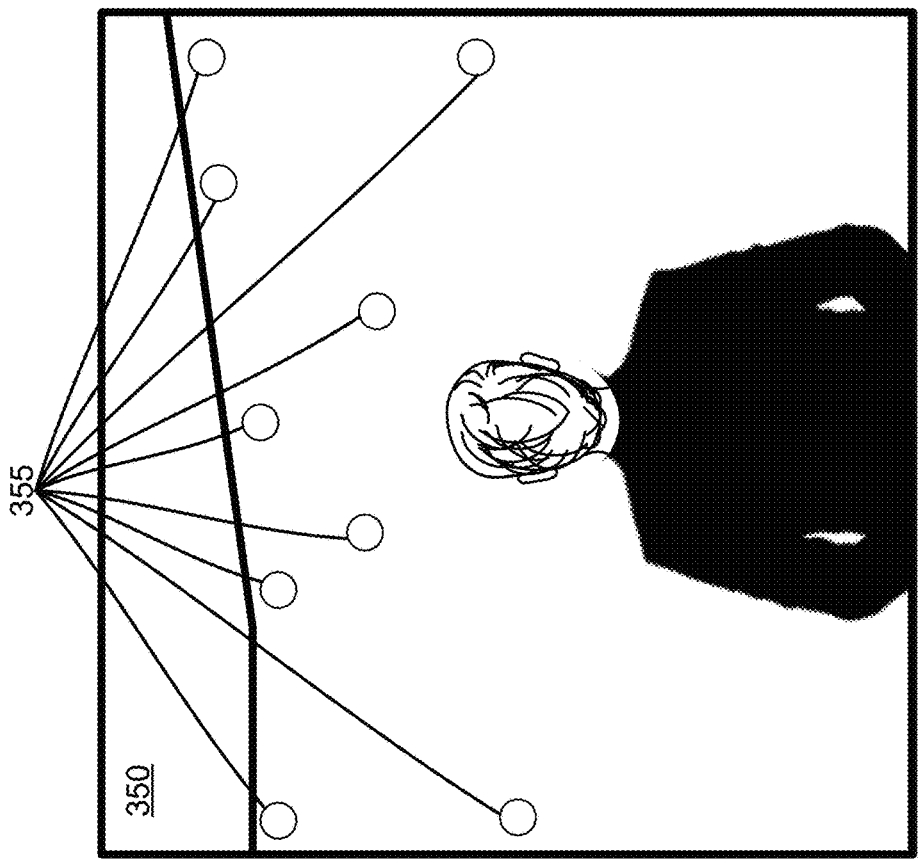
FIGS. 3A-3C illustrate the capture of a base image of a test subject, in accordance with implementations described herein.
Figure 3B:
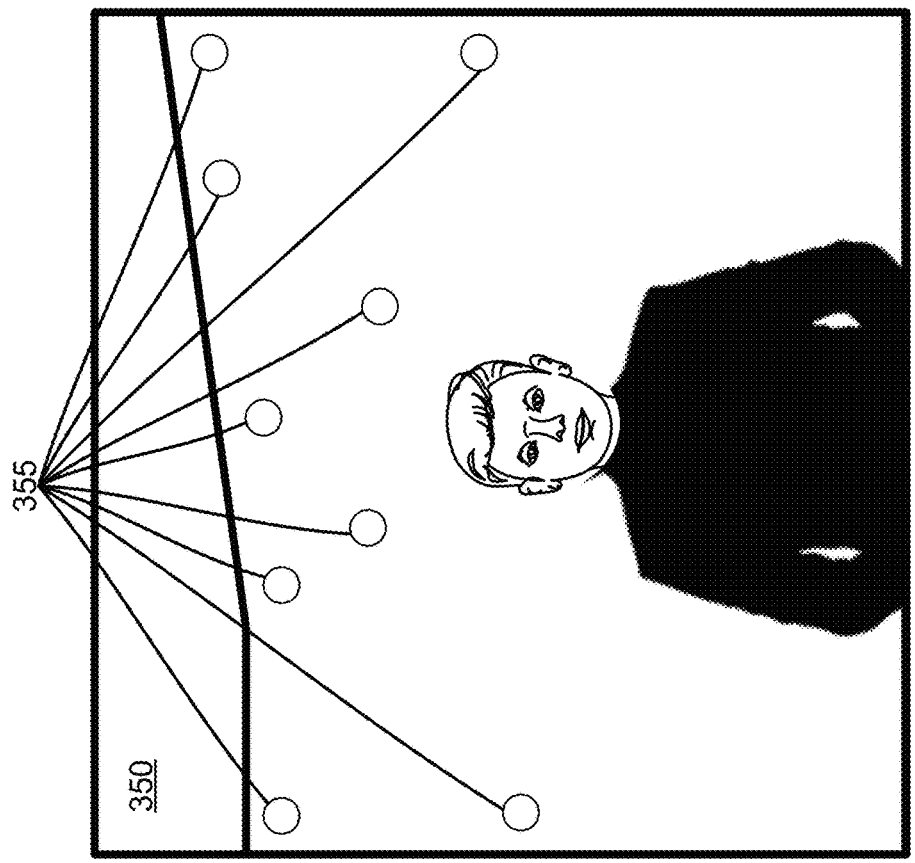

FIG. 3A is a front view, and FIG. 3B is a rear view, of a test subject in an example capture space 350 in which a first three-dimensional image, or scan, of the head of the test subject may be captured. An image capture assembly positioned in the example capture space 350 may include a plurality of example capture devices 355, or cameras 355. The example capture devices 355, or cameras 355, may be positioned throughout the example capture space 350 to provide for the capture of 360-degree image data of the head of the test subject. The example capture devices 355 may include, for example, image sensors, light sensors, depth sensors, light sources, and other such devices involved in the capture of a three-dimensional image or scan, and various combinations and/or arrangements thereof. The arrangement of the capture devices 355 of the image capture assembly shown in FIGS. 3A and 3B presents one example arrangement of example capture devices 355 in an example capture space 350. The image capture assembly may include other types and/or arrangements of components, in a similar space or other types of spaces, to capture the three-dimensional image, or scan, of the head of the test subject.

Figure 3C:
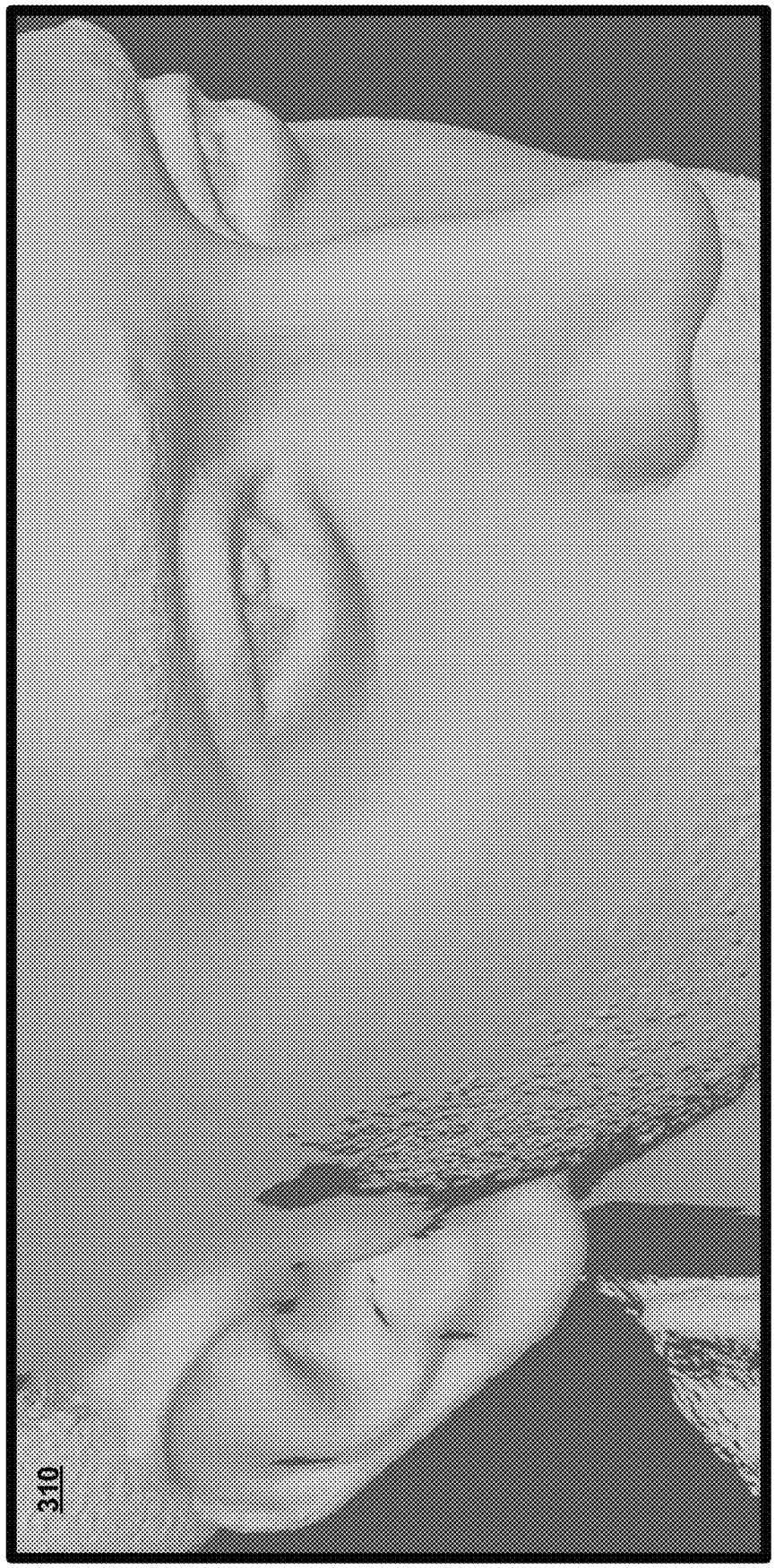

In some examples, the plurality of capture devices 355 may be operated to capture a three-dimensional scan of the head of the test subject in the capture space 350. In the example shown in FIGS. 3A and 3B, the test subject is not wearing glasses, and the three-dimensional image, or scan, captured by the capture devices 355 may yield a three-dimensional base image 310, as shown in FIG. 3C. The example base image 310 shown in FIG. 3C presents a relevant portion of the three-dimensional image, or scan, that may be captured by the capture devices 355. In particular, as this example is described with respect to the validation of the predicted placement and/or simulation of glasses on the head of the test subject, a portion of the head of the test subject relevant to the placement of glasses is shown in FIG. 3C, simply for purposes of discussion and illustration. The three-dimensional image, or scan, produced based on the image data captured by the plurality of capture devices 355 in the capture space 350 may include a full 360-degree capture of the head of the test subject.

Figure 4C:
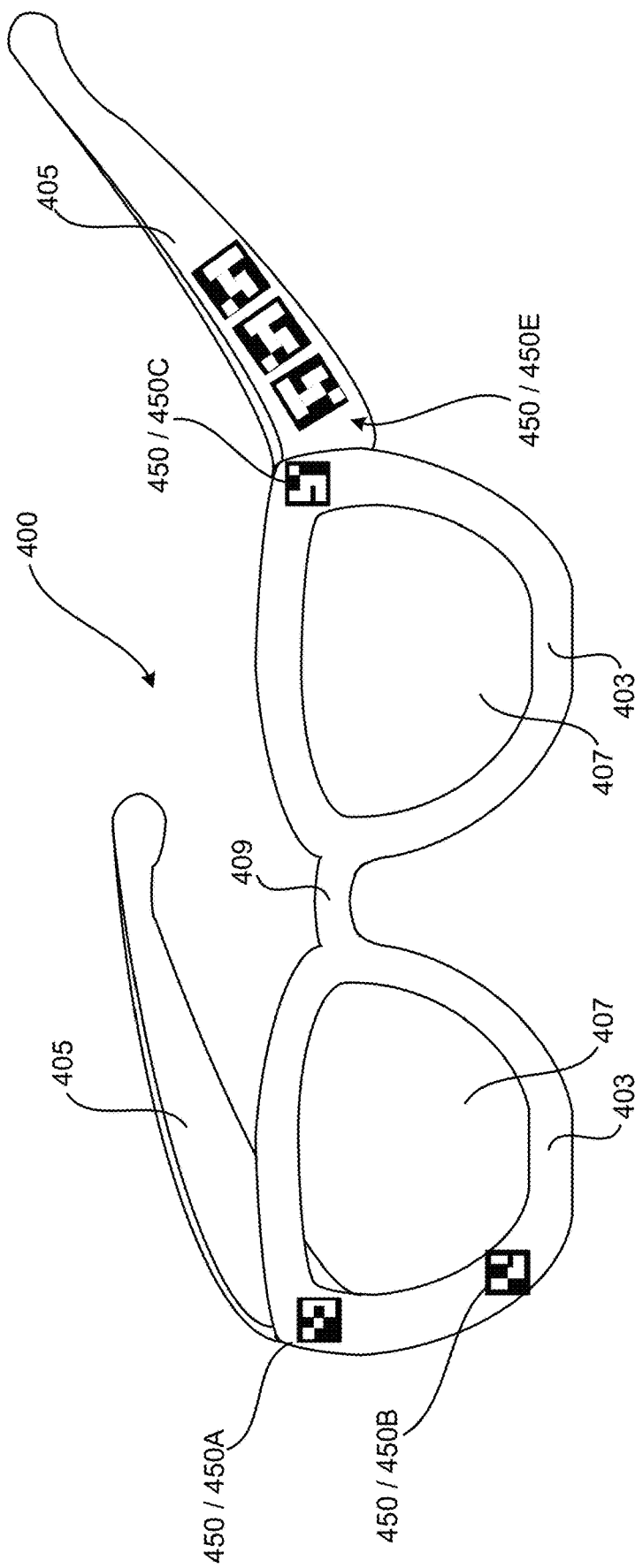

FIG. 4A is a front view, and FIG. 4B is a rear view, of the test subject in the example capture space 350. In the example shown in FIGS. 4A and 4B, the test subject is wearing a head mounted wearable device. The example wearable device shown in FIGS. 4A and 4B is an example fitting frame 400, as shown in FIG. 4C. The example fitting frame 400 may be physically, or geometrically representative of actual frames of a head mounted wearable device to be worn by a user, but simply for sizing/fitting purposes, and thus non-functional. The example fitting frame 400 shown in FIG. 4C includes rim portions 403 defining lens areas 407 in which glass portion(s), or lenses may be received. A bridge portion 409 connects the rim portions 403. Arm portions 405 may be coupled, for example, pivotably coupled to a respective rim portion 403. The example fitting frame 400 shown in FIG. 4C includes example visual markers 450 that may be identified, or recognized in an image-based data capture including the fitting frame 400. The example fitting frame 400 shown in FIG. 4C includes a first visual marker 450A and a second visual marker 450B at an outer peripheral portion of one of the rim portions 403, and a third visual marker 450C at an outer peripheral portion of the other of the rim portions 403. The example fitting frame 400 may include one or more fourth visual markers 450D (not shown in FIG. 4C; see FIG. 4D) on one of the arm portions 405, and one or more fifth visual markers 450E on the other of the arm portions 405. In the example shown in FIG. 4C, the visual markers 450 include a detectable pattern within the boundaries thereof. One or more of the patterns may provide for the identification of a configuration of the fitting frame 400. The configuration may include, for example, a size of the fitting frame 400, a contour of the rim portions 403/lens areas 407, a length of the bridge portion 409, a length of the arm portions 405, a distance between the arm portions 405, a tilt angle of the rim portions 403 relative to the arm portions 405, and other such information.

An example number and an example arrangement of the example visual markers 450 is shown on the example fitting frames 400 for purposes of discussion and illustration. The example fitting frames 400 may include more, or fewer, visual markers 450, arranged as shown, or differently. The example visual markers 450 shown in FIG. 4C include an identifiable pattern within substantially rectangular boundaries of the respective visual marker 450, simply for purposes of discussion and illustration. In some examples, the fitting frames may include visual markers 450 having different shapes and/or combinations of shapes, different patterns and/or combinations of patterns, visual markers that do not include a pattern, other types of identifiable features, and the like. In some examples, one or more of the visual markers 450 may provide for identification of a configuration of the fitting frames 400. In some examples, a pose of the fitting frame 400 may be determined based on the detection of one or more of the visual markers 450, known positions of the detected visual markers 450 on the fitting frames 400, and the like.

In the example arrangement shown in FIG. 4C, the visual markers 450 are defined by a substantially rectangular boundary, such that each of the visual markers 450 includes four corners that may themselves serve as markers or indices. For example, the first, second and third markers 450A, 450B, 450C may include four total corners (i.e., twelve indices) lying in a single plane (i.e., corresponding to the plane of the front face of the fitting frame 400 such that detection of the first, second and third markers 450A, 450B, 450C may facilitate the determination of a three-dimensional pose of a front face of the fitting frame 400, alone or together with the configuration information. Similarly, detection of the corners associated with the fourth visual markers 450D may facilitate the determination of a three-dimensional pose of the first arm portion 405, and the fifth visual markers 450E may facilitate the determination of a three-dimensional pose of the second arm portion 405, alone or together with the configuration information.

Figure 4D:
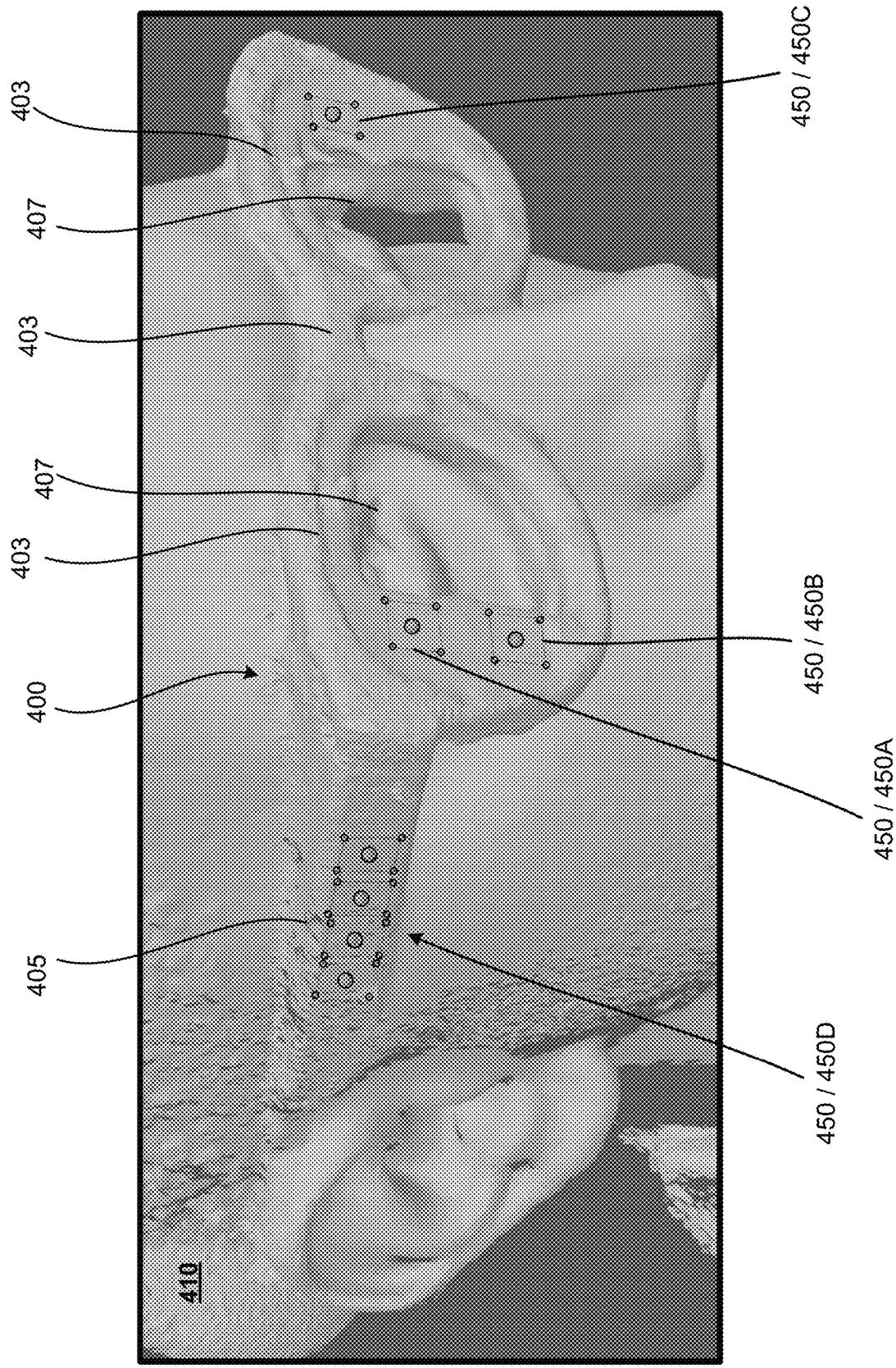

In some examples, the plurality of capture devices 355 may be operated to capture a three-dimensional scan of the head of the test subject in the capture space 350 as shown in FIGS. 4A and 4B, in which the test subject is wearing the fitting frame 400. The three-dimensional image, or scan, captured by the capture devices 355 may yield a three-dimensional reference image 410, as shown in FIG. 4D. As shown in FIG. 4D, the visual markers 450 may be detected within the reference image 410. In the example shown in FIG. 4D, respective corners of the visual markers 450 and respective central portions of the visual markers 450 are detected. The example reference image 410 shown in FIG. 4D presents a relevant portion of the three-dimensional image, or scan, that may be captured by the capture devices 355 (and also, for example, corresponding to the base image 310 shown in FIG. 3C). In this example, the reference image 410 shows a portion of the head of the test subject wearing the fitting frame 400. The three-dimensional image, or scan, produced based on the image data captured by the plurality of capture devices 355 in the capture space 350 may include a full 360-degree capture of the head of the test subject wearing the fitting frame 400.

FIGS. 5A-5J illustrate a process, in accordance with implementations described herein, for validation of a simulation module of a computing system that provides for the simulated placement of glasses on a head of a user based on three-dimensional images, or scans, of one or more test subjects wearing one or more different types of fitting frames as described above. In the process to be described with respect to FIGS. 5A-5J, a three-dimensional image of a test subject without a fitting frame, such as the example base image 310 described above, and a three-dimensional image of the test subject wearing a fitting frame, such as the fitting frame 400 in the reference image 410 described above, are captured. The simulator may generate a simulated image, simulating glasses (corresponding to the fitting frame 400) on the head of the test subject as captured in the base image 310. Visual markers in each of the simulated image and the reference image may be used to quantitatively measure differences between the simulated pose of the glasses (the fitting frame 400) on the head of the test subject, and the actual pose of the fitting frame 400 on the test subject as captured in the reference image 410.

Figure 5A:
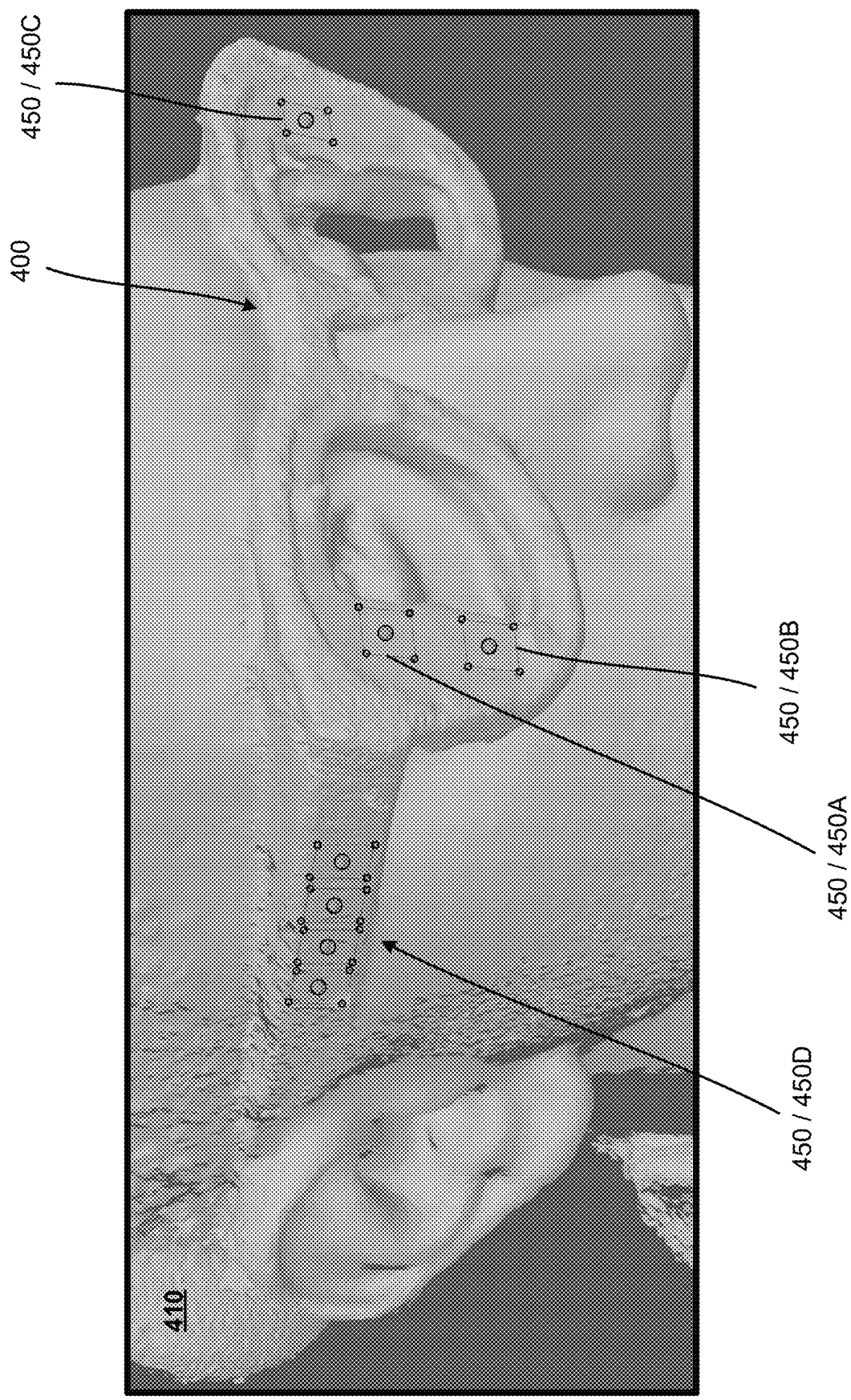
FIGS. 5A-5J illustrate a process for validation of a simulation module providing for simulated placement of glasses on a head of a user, in accordance with implementations described herein.
Figure 5B:
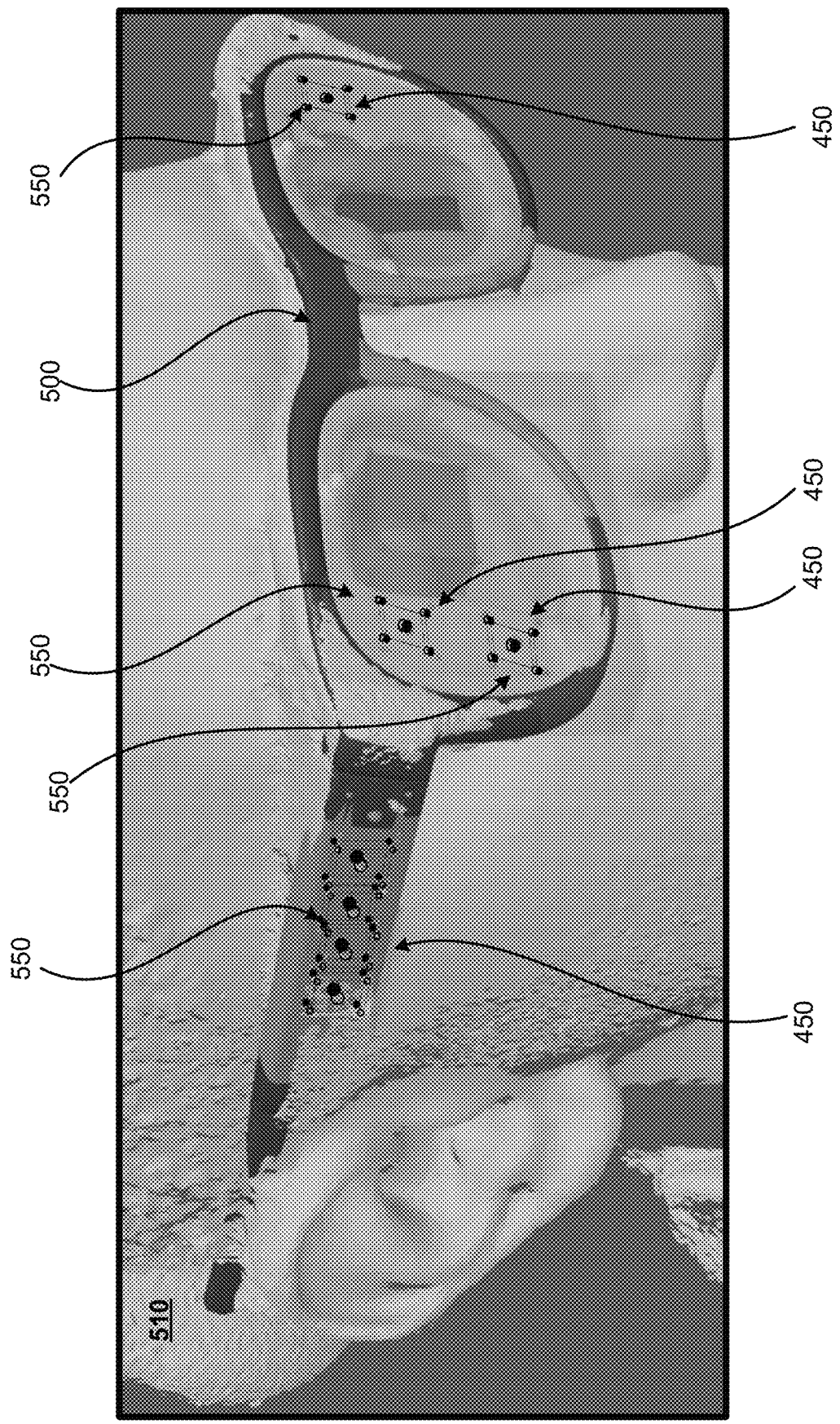

As shown in FIG. 5A, the reference image 410, including the test subject wearing the physical fitting frame 400, may be loaded into the system. A three-dimensional model 500 of the fitting frame 400 may be retrieved, for example, from a database of the computing system 1100 and/or a three-dimensional modeling module of the computing system 1100. The three-dimensional model 500 of the fitting frame 400 may be superimposed on the reference image 410 (in which the test subject is wearing the physical fitting frame 400) to form a combined image 510, as shown in FIG. 5B. When superimposing the three-dimensional model 500 of the fitting frame 400 onto the reference image 410, the markers 550 on the three-dimensional model 500 are aligned with the positions of the corresponding markers 450 of the fitting frame 400 in the reference image 410. In the combined image 510 shown in FIG. 5B, an offset between the markers 550 on the three-dimensional model 500 and the markers 450 on the fitting frame 400 as worn by the test subject in the reference image 410 indicates a difference between the initial placement of the three-dimensional model 500 and the physical position of the fitting frame 400 as captured in the reference image 410.

In some examples, a position of the three-dimensional model 500 is adjusted to align with, or correspond to, the position of the fitting frame 400 as worn by the user in the reference image 410. For example, a first alignment may be performed to align the visual markers 550 on the rim portions of the three-dimensional model 500 with the corresponding visual markers 450 on the rim portions 403 of the fitting frame 400. A second alignment may be performed to align the visual markers 550 on the arm portions of the three-dimensional model 500 with the corresponding visual markers 450 on the arm portions 405 of the fitting frame 400. Measurement of placement error between the corresponding markers 450, 550 may provide an indication of an adjustment in position and/or orientation and/or contour and/or bend and/or flex and the like to match the as worn condition of the fitting frame 400. By making these types of adjustments to the three-dimensional model 500, a contour (bend, flex and the like) of the three-dimensional model, and other such adjustments, the three-dimensional model 500 of the fitting frame can be aligned into the same three-dimensional coordinate space as the fitting frame 400 worn by the test subject in the reference image 410. Differences in the position of the three-dimensional model 500 and the physical fitting frame 400 worn by the test subject in the reference image 410 (for example, bridge position, pantoscopic angle, bend across the rim portions and bridge portion, bend at the arm portions, and the like) may be taken into consideration to provide for adjustment of the modeling and simulation of glasses as worn by the user.

Figure 5C:
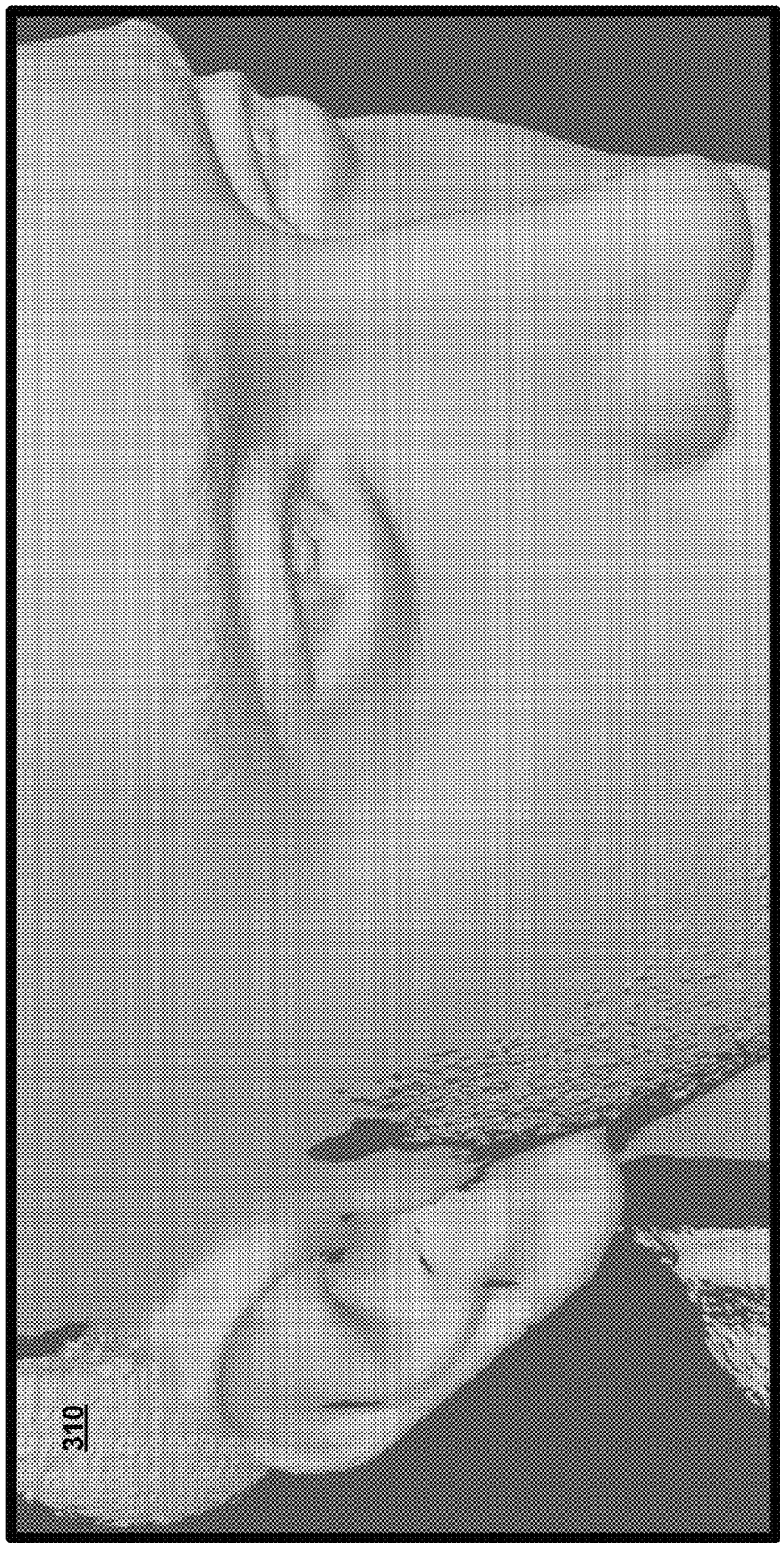
Figure 5D:
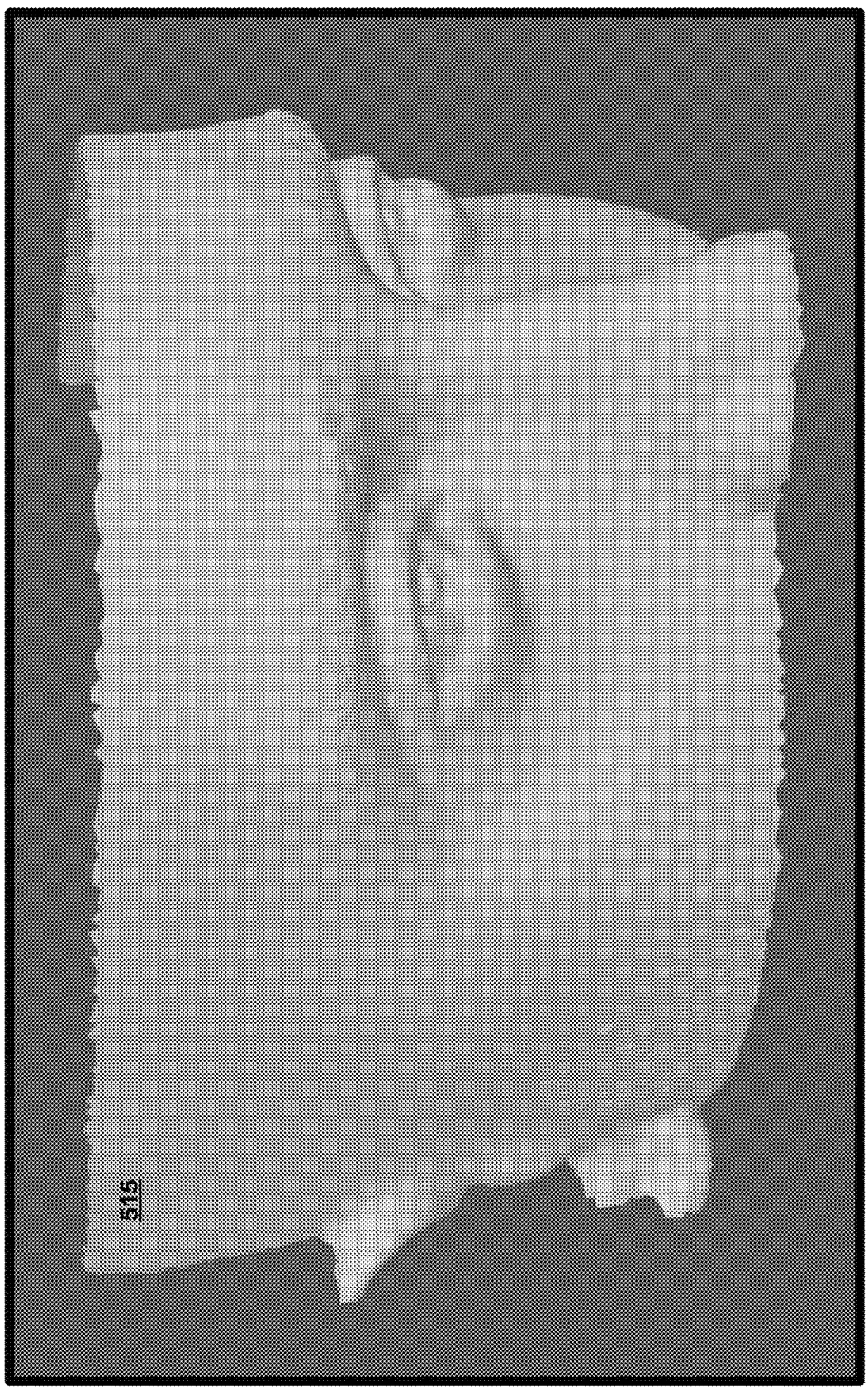
Figure 5E:
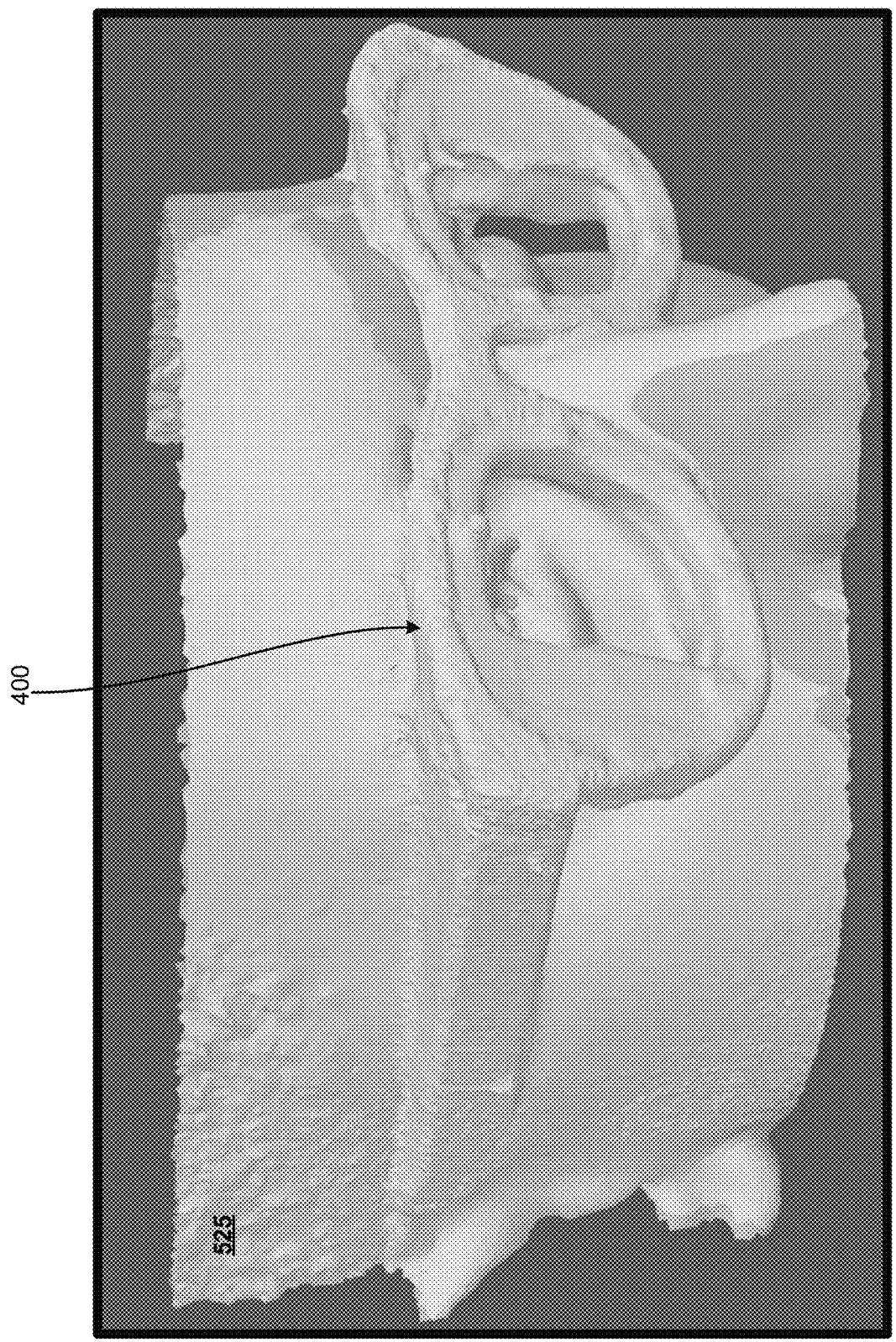

As shown in FIG. 5C, the base image 310, including the test subject without the physical fitting frame 400, may be loaded into the system. As shown in FIG. 5D, a first extracted image 515 may be generated based on, or extracted from, the base image 310. In this example, the first extracted image 515 may represent a region or portion of the head of the test subject in the base image that is to be aligned with a corresponding portion of the reference image 410 for the positioning of the glasses (fitting frame 400). As shown in FIG. 5E, a second extracted image 525 may be generated based on, or extracted from, the reference image 410 including the head of the test subject wearing the fitting frame 400. In this example, the extracted region included in the second extracted image 525 corresponds to the extracted region included in the first extracted image 515. As shown in FIG. 5E, there is some misalignment between the extracted portion of the reference image 410 and the extracted portion of the base image 310 due to, for example, a change in head pose of the test subject in the two separate image captures.

Figure 5F:
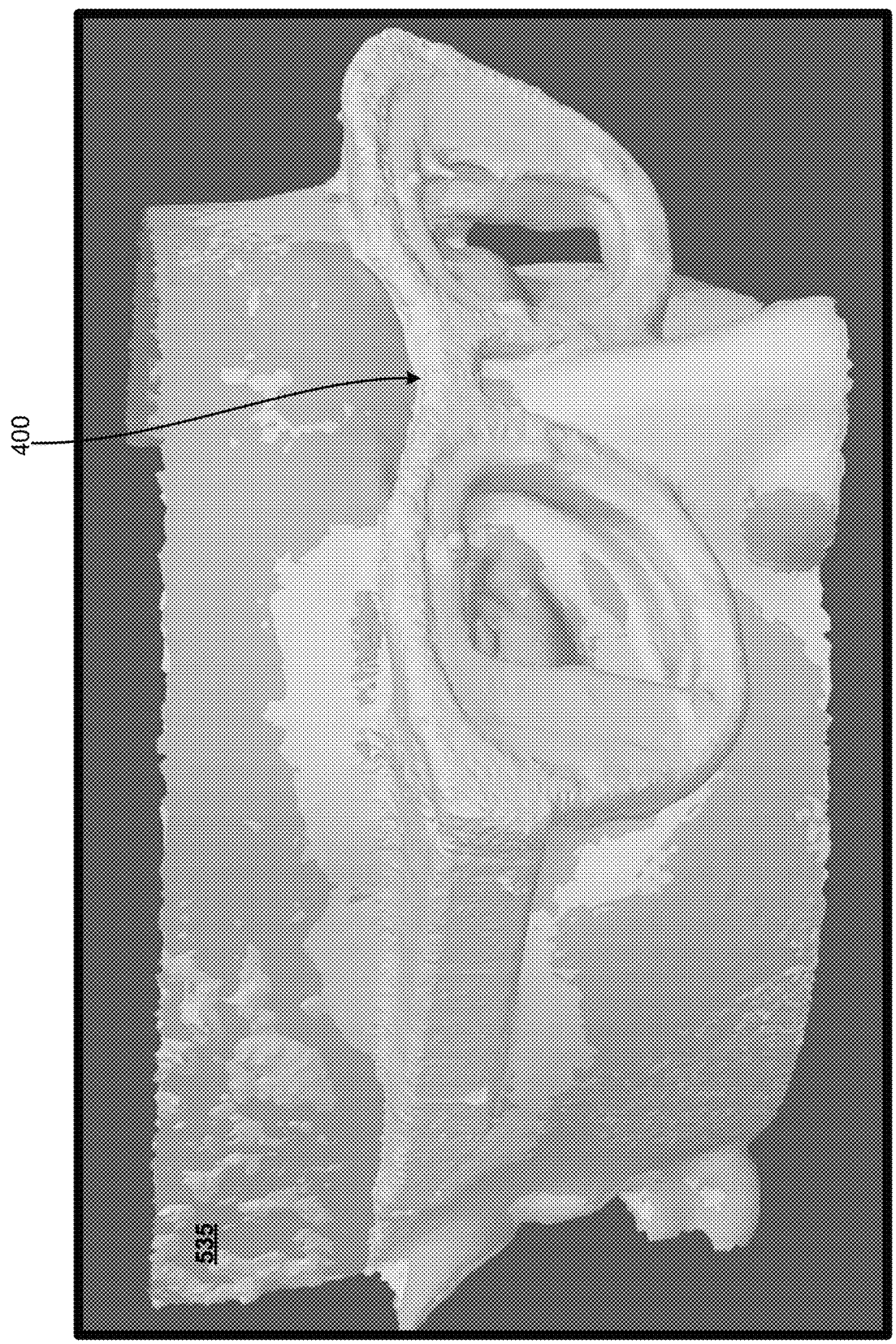

FIG. 5F illustrates an aligned image 535, in which the extracted region of the reference image 410 shown in the second extracted image 525 is aligned onto the extracted region of the base image 310 shown in the first extracted image 515. The position of the physical fitting frame 400 on the head of the test subject is available in the reference image 410. This physical position of the fitting frame 400 cannot be directly transferred onto the base image 310 including the head of the test subject without the fitting frame 400, as the head position, pose and the like in the reference image 410 do not necessarily match that of the base image 310. Using the extracted images 515, 525 focuses on relevant regions of the face/head of the test subject that remain substantially constant such as, for example bony part of the face such as the bridge of the nose, the forehead and the like. Using the extracted images 515, 525 eliminates areas that may change, such as the mouth, nostrils and the like, thus reducing variance. Alignment in this manner eliminates the need to remove the fitting frame 400 from the three-dimensional mesh of the head associated with the reference image 310. An alignment between the three-dimensional mesh of the first extracted image 515 and the second extracted image 525 may provide an indication of how to adjust the head pose in the reference image 410 to align with the head pose in the base image 310, so that the base image 310 and the reference image 410 are aligned in corresponding three-dimensional spaces, or a common frame of reference.

Figure 5G:
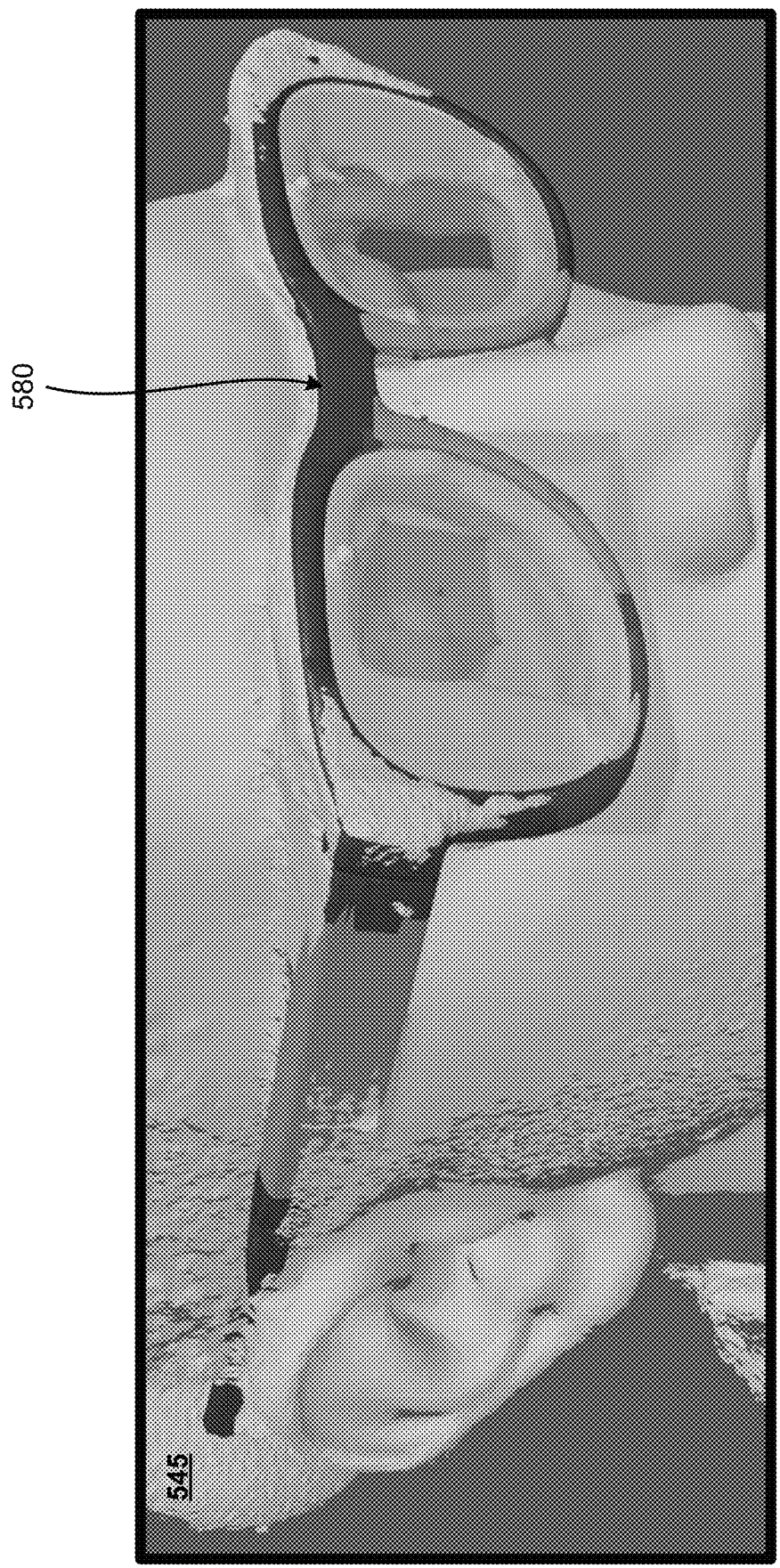
Figure 5H:
Figure 5I:
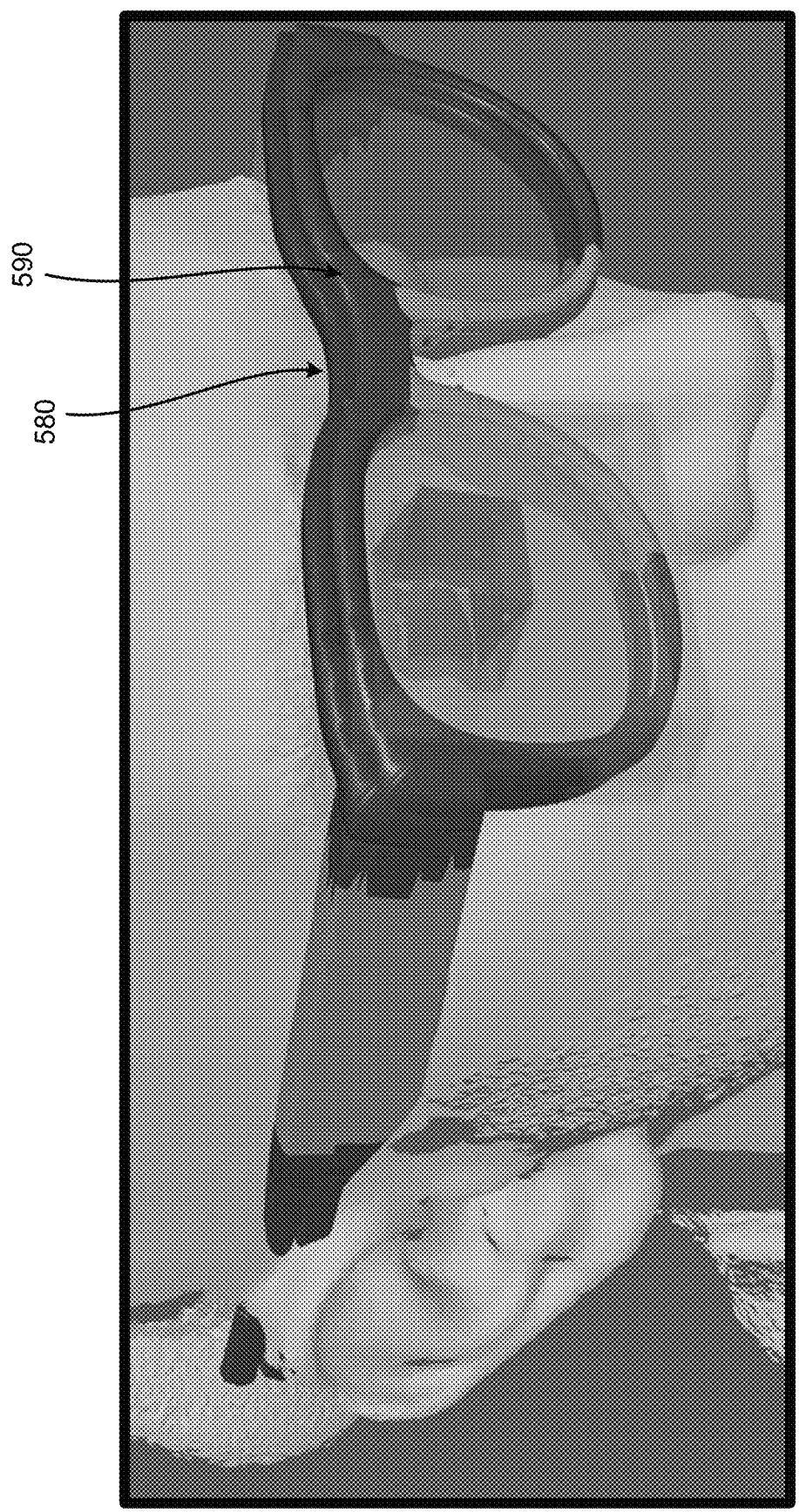
Figure 5J:
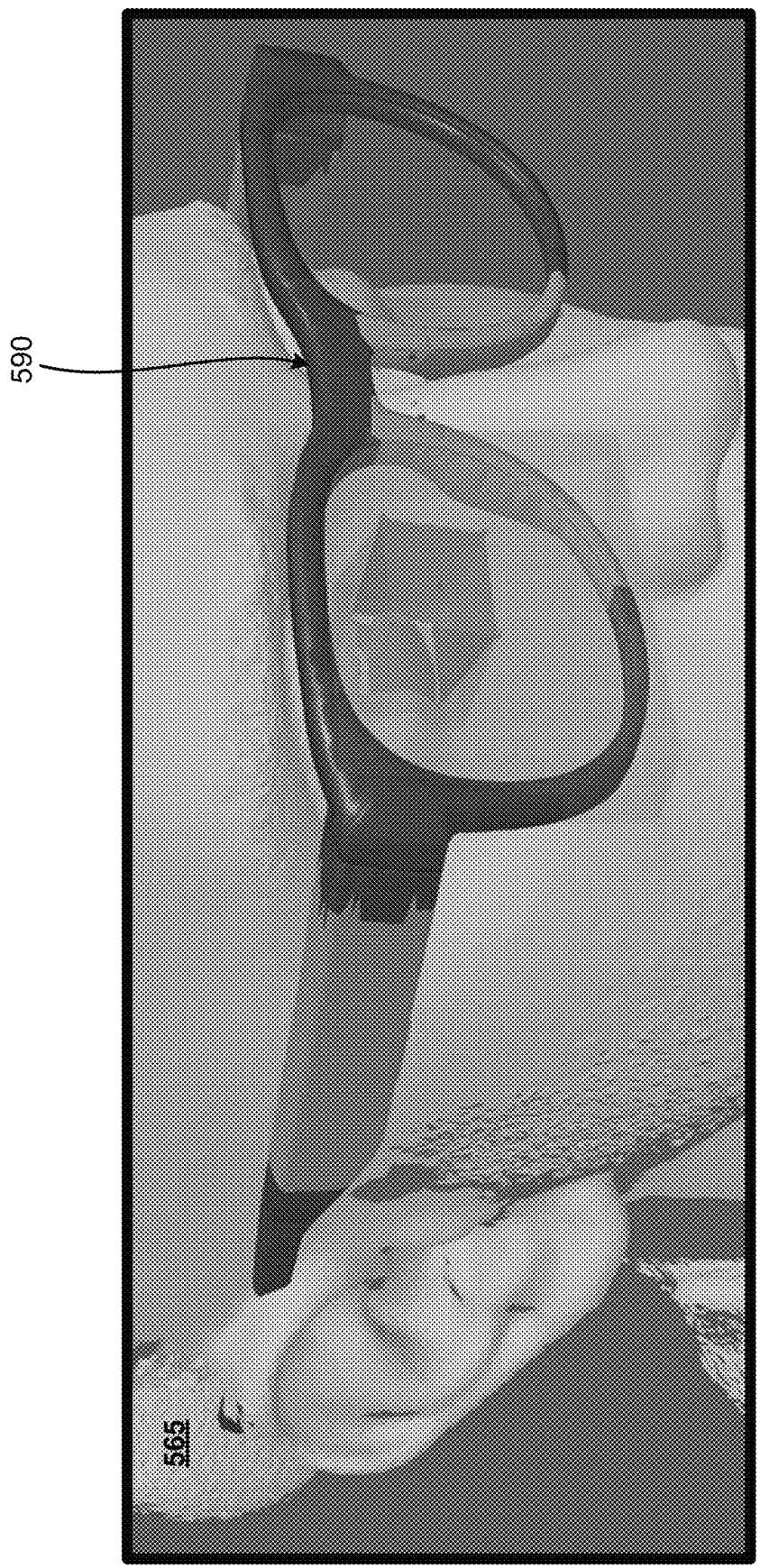

The calculated alignment may provide for the simulated positioning of glasses 580 rendered onto the reference image 410, as in the transform image 545 shown in FIG. 5G. This may, in turn provide for the transfer of the simulation of the glasses onto the base image 310 (i.e., the image of the head of the test subject in which the test subject is not wearing the fitting frames 400), as shown in the transfer image 555 illustrated in FIG. 5H. With the transform complete as described above, the system may run a fitting simulation to generate a simulation image 565. FIG. 5I illustrates the simulated glasses 590 superimposed on, or overlapping, the fitting frames 400 as positioned in the transform space of the transform image 555 shown in FIG. 5H. FIG. 5J illustrates the simulated glasses 590 positioned on the head of the test subject as captured in the base image 310.

Figure 6:
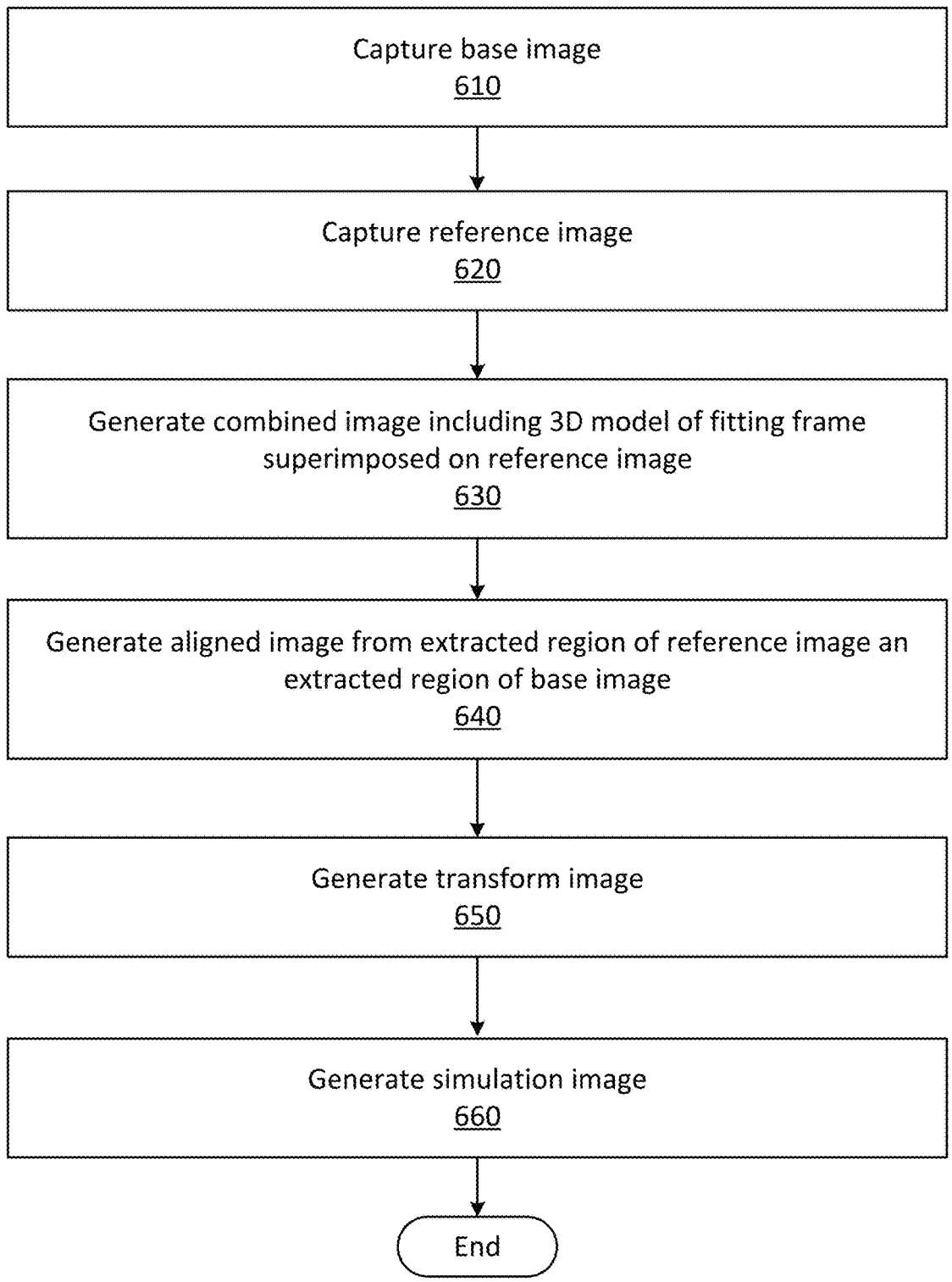
FIG. 6 is a flowchart of a method, in accordance with implementations described herein.

FIG. 6 is a flowchart of a method 600, in accordance with implementations described herein. The method 600 may provide for the validation and adjustment of algorithms and/or machine learning models associated with the simulation of a wearable device in the form of, for example, a head mounted wearable device, such as smart glasses including a display device on the head of a user through the capture of images of one or more test subjects both with and without fitting frames. The principles to be described herein may be applied to the validation and adjustment of algorithms associated with the simulation of other types of wearable devices.

A base image may be captured by, for example, an image capture assembly (block 610). The image capture assembly may include one or more image capture devices positioned in an image capture space so as to capture a three-dimensional image of a test subject in the image capture space. The base image may include an image of a body portion of a user, on which a wearable device is to be worn. For example, the base image may include a three-dimensional image capturing a face and a head of the user, in which the user is not wearing the head mounted wearable device. A reference image may be captured by the image capture assembly (block 620). The reference image may include an image of the body portion of the user, wearing the wearable device. For example, the reference image may include a three-dimensional image capturing the face and the head of the user wearing a fitting frame including one or more visual markers and/or one or more known features that are detectable from the reference image captured by the image capture assembly. A combined image may be generated, including a three-dimensional model of the fitting frame superimposed on the reference image. The three-dimensional model of the fitting frame may be retrieved from a database including modeling and configuration information associated with a plurality of fitting frames. Markers on the three-dimensional model of the fitting frame may be aligned with markers on the fitting frame worn by the test subject in the reference image to position the three-dimensional model of the fitting frame in the combined image. An aligned image may be generated based on the base image and the reference image (block 630). The combined image may include a region of interest extracted from the reference image superimposed on a region of interest extracted from the base image. The region of interest may be a region corresponding to a worn region of the wearable device. An aligned image may be generated to align the base image and the reference image in a common three-dimensional space, or common frame of reference (block 640). A transform image may be generated (block 650), based on the alignment calculated from the combined image and reflected in the aligned image, positioning simulated glasses onto the reference image. A simulation image may then be generated (block 660), based on the transform image. The positioning of the simulated glasses on the reference image may be transferred onto the base image, as the base image and the reference image have been brought into a common three-dimensional space, or common frame of reference.

Figure 7:
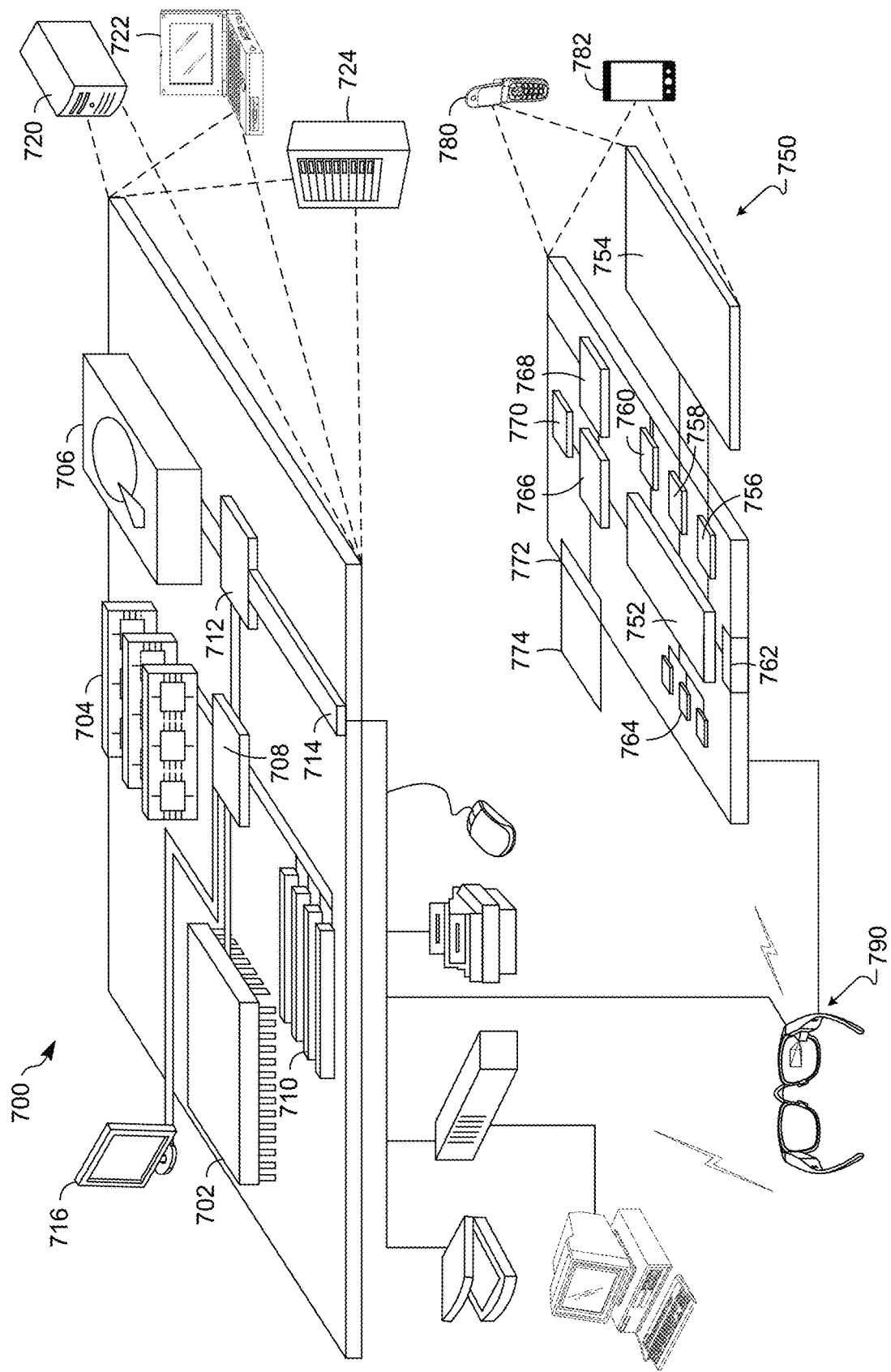
FIG. 7 illustrates example computing devices of the computing systems discussed herein.

FIG. 7 illustrates an example of a computer device 700 and a mobile computer device 750, which may be used with the techniques described here (e.g., to implement the client computing device and/or the server computing device and/or the provider resources described above). The computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display), and LED (Light Emitting Diode) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 790 to generate an augmented environment for viewing inserted content within the physical space. For example, one or more sensors included on a computing device 750 or other computing device depicted in the figure, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790. The user's interactions with the computing device may be translated to interactions with a user interface generated in the AR environment for a controllable device.

In some implementations, a computing device 750 may include a touchscreen. For example, a user can interact with the touchscreen to interact with a user interface for a controllable device. For example, the touchscreen may include user interface elements such as sliders that can control properties of the controllable device.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
    generating, by a simulation module of a computing system, a combined image, the combined image including a three-dimensional model of a fitting frame superimposed on a reference image, the reference image including a three-dimensional image of the fitting frame worn on a head of a subject;
    generating, by the simulation module, an aligned image, including superimposing the reference image onto a base image, the base image including a three-dimensional image of the head of the subject;
    calculating, from the aligned image, an alignment between a pose of the head of the subject in the base image and a pose of the head of the subject in the reference image superimposed on the base image;
    positioning a rendering of the fitting frame on the reference image based on the alignment calculated from the aligned image; and
    generating a simulation image, including positioning the rendering of the fitting frame on the base image based on the aligned position of the rendering of the fitting frame on the reference image.

2. The method of claim 1, wherein generating the combined image includes:
    detecting at least one visual marker on the fitting frame worn by the subject in the reference image;
    detecting at least one corresponding visual marker on the three-dimensional model of the fitting frame; and
    superimposing the three-dimensional model of the fitting frame on the reference image with the at least one corresponding visual marker detected on the three-dimensional model of the fitting frame aligned with the at least one visual marker detected on the fitting frame worn by the subject in the reference image.

3. The method of claim 2, wherein detecting the at least one visual marker on the fitting frame worn by the subject in the reference image includes detecting the at least one visual marker located at at least one of:
    an outer peripheral portion of a first rim portion of the fitting frame;
    an outer peripheral portion of a second rim portion of the fitting frame;
    a first arm portion of the fitting frame; or
    a second arm portion of the fitting frame.

4. The method of claim 3, wherein superimposing the three-dimensional model of the fitting frame on the reference image includes aligning a plurality of corners of the at least one visual marker of the three-dimensional model of the fitting frame with a corresponding plurality of corners of the at least one visual marker of the fitting frame worn by the subject in the reference image.

5. The method of claim 2, wherein
- the at least one visual marker on the fitting frame includes at least one visual marker on a rim portion of the fitting frame and at least one visual marker on an arm portion of the fitting frame, and
- the at least one corresponding visual marker on the three-dimensional model includes at least one visual marker on a rim portion of the three-dimensional model and at least one visual marker on an arm portion of the three-dimensional model.

6. The method of claim 5, further comprising:
- aligning the at least one visual marker on the rim portion of the three-dimensional model with a corresponding at least one visual marker on the rim portion of the fitting frame in the reference image;
- measuring a first placement difference between the three-dimensional model and the fitting frame based on the aligning of the at least one visual marker on the rim portion of the three-dimensional model and the corresponding at least one visual marker on the rim portion of the fitting frame;
- aligning the at least one visual marker on the arm portion of the three-dimensional model with the corresponding at least one visual marker on the arm portion of the fitting frame; and
- measuring a second placement difference between the three-dimensional model and the fitting frame based on the aligning of the at least one visual marker on the arm portion of the three-dimensional model and the corresponding at least one visual marker on the rim portion of the fitting frame.

7. The method of claim 6, further comprising adjusting an algorithm of the simulation module to incorporate the first placement difference and the second placement difference.

8. The method of claim 1, wherein generating the aligned image includes:
- generating a first extracted image from the base image, the first extracted image capturing a defined portion of the base image corresponding to region of the head of the subject associated with the fitting frame from the base image;
- generating a second extracted image from the reference image, the second extracted image capturing a defined portion of the reference image corresponding to the region of the head of the subject wearing the fitting frame; and
- superimposing the second extracted image on the first extracted image.

9. The method of claim 1, further comprising:
- capturing, by an image capture assembly of the computing system, the base image including the three-dimensional head of the subject without the fitting frame; and
- capturing, by the image capture assembly, the reference image including the three-dimensional head of the subject wearing the fitting frame.

10. The method of claim 9, wherein the pose of the head of the subject in the base image is different from the pose of the head of the subject in the reference image.

11. A non-transitory computer-readable medium storing executable instructions that, when executed by at least one processor of a computing system, are configured to cause the at least one processor to:
- generate, by a simulation module of the computing system, a combined image, the combined image including a three-dimensional model of a fitting frame superimposed on a reference image, the reference image including a three-dimensional image of the fitting frame worn on a head of a subject;
- generate, by the simulation module, an aligned image, including superimposing the three-dimensional reference image onto a base image, the base image including a three-dimensional image of the head of the subject;
- calculate, from the aligned image, an alignment between a pose of the head of the subject in the base image and a pose of the head of the subject in the reference image superimposed on the base image;
- position a rendering of the fitting frame on the reference image based on the alignment calculated from the aligned image; and
- generate a simulation image, including positioning the rendering of the fitting frame on the base image based on the aligned position of the rendering of the fitting frame on the reference image.

12. The non-transitory computer-readable medium of claim 11, wherein the instructions are configured to cause the at least one processor to generate the combined image, including:
- detect at least one visual marker on the fitting frame worn by the subject in the reference image;
- detect at least one corresponding visual marker on the three-dimensional model of the fitting frame; and
- superimpose the three-dimensional model of the fitting frame on the reference image with the at least one corresponding visual marker detected on the three-dimensional model of the fitting frame aligned with the at least one visual marker detected on the fitting frame worn by the subject in the reference image.

13. The non-transitory computer-readable medium of claim 12, wherein the instructions are configured to cause the at least one processor to detect the at least one visual marker on the fitting frame worn by the subject in the reference image including detecting the at least one visual marker located at at least one of:
- an outer peripheral portion of a first rim portion of the fitting frame;
- an outer peripheral portion of a second rim portion of the fitting frame;
- a first arm portion of the fitting frame; or
- a second arm portion of the fitting frame.

14. The non-transitory computer-readable medium of claim 13, wherein the instructions are configured to cause the at least one processor to superimpose the three-dimensional model of the fitting frame on the reference image, including:
- align a plurality of corners of the at least one visual marker of the three-dimensional model of the fitting frame with a corresponding plurality of corners of the at least one visual marker of the fitting frame worn by the subject in the reference image.

15. The non-transitory computer-readable medium of claim 12, wherein
- the at least one visual marker on the fitting frame includes at least one visual marker on a rim portion of the fitting frame and at least one visual marker on an arm portion of the fitting frame, and
- the at least one corresponding visual marker on the three-dimensional model includes at least one visual marker on a rim portion of the three-dimensional model and at least one visual marker on an arm portion of the three-dimensional model.

16. The non-transitory computer-readable medium of claim 15, wherein the instructions are configured to cause the at least one processor to:
- align the at least one visual marker on the rim portion of the three-dimensional model with the corresponding at least one visual marker on the rim portion of the fitting frame in the reference image;
- measure a first placement difference between the three-dimensional model and the fitting frame based on the aligning of the at least one visual marker on the rim portion of the three-dimensional model and the corresponding at least one visual marker on the rim portion of the fitting frame;
- align the at least one visual marker on the arm portion of the three-dimensional model with the corresponding at least one visual marker on the arm portion of the fitting frame; and
- measure a second placement difference between the three-dimensional model and the fitting frame based on the aligning of the at least one visual marker on the arm portion of the three-dimensional model and the corresponding at least one visual marker on the rim portion of the fitting frame.

17. The non-transitory computer-readable medium of claim 16, wherein the instructions are configured to cause the at least one processor to adjust an algorithm of the simulation module to incorporate the first placement difference and the second placement difference.

18. The non-transitory computer-readable medium of claim 11, wherein the instructions are configured to cause the at least one processor to generate the aligned image, including:
- generate a first extracted image from the base image, the first extracted image capturing a defined portion of the base image corresponding to region of the head of the subject associated with the fitting frame from the base image;
- generate a second extracted image from the reference image, the second extracted image capturing a defined portion of the reference image corresponding to the region of the head of the subject wearing the fitting frame; and
- superimpose the second extracted image on the first extracted image.

19. The non-transitory computer-readable medium of claim 11, wherein the instructions are configured to cause the at least one processor to:
- capture, by an image capture assembly of the computing system, the base image including the head of the subject without the fitting frame; and
- capture, by the image capture assembly, the reference image including the head of the subject wearing the fitting frame.

20. The non-transitory computer-readable medium of claim 19, wherein the pose of the head of the subject in the base image is different from the pose of the head of the subject in the reference image.

* * * * *